US011506825B1

(12) United States Patent
Ouderkirk et al.

(10) Patent No.: US 11,506,825 B1
(45) Date of Patent: Nov. 22, 2022

(54) ELASTOMER BASED FLEXURES FOR FLUID LENSES

(71) Applicant: META PLATFORMS TECHNOLOGIES, LLC, Menlo Park, CA (US)

(72) Inventors: Andrew John Ouderkirk, Redmond, WA (US); Katherine Marie Smyth, Seattle, WA (US); John Cooke, Bothell, WA (US); James Ransley, Medford, MA (US); Nagi Elabbasi, Southborough, MA (US)

(73) Assignee: Meta Platforms, Inc., Menlo Park, CA (US)

( * ) Notice: Subject to any disclaimer, the term of this patent is extended or adjusted under 35 U.S.C. 154(b) by 256 days.

(21) Appl. No.: 16/662,858

(22) Filed: Oct. 24, 2019

(51) Int. Cl.
| *G02B 3/14* | (2006.01) |
| *G02C 7/08* | (2006.01) |
| *G02B 26/00* | (2006.01) |
| *G02B 3/12* | (2006.01) |
| *G02B 3/00* | (2006.01) |
| *B32B 25/08* | (2006.01) |

(52) U.S. Cl.
CPC ............. *G02B 3/14* (2013.01); *G02B 3/0012* (2013.01); *G02B 3/12* (2013.01); *G02B 26/004* (2013.01); *G02C 7/085* (2013.01); *B32B 25/08* (2013.01)

(58) Field of Classification Search
CPC ...... G02B 3/14; G02B 3/0012; G02B 26/004; G02B 3/12; G02C 7/085; B32B 25/08
See application file for complete search history.

(56) References Cited

U.S. PATENT DOCUMENTS

| 5,138,494 A | 8/1992 | Kurtin |
| 5,371,629 A | 12/1994 | Kurtin et al. |

(Continued)

FOREIGN PATENT DOCUMENTS

| WO | 2013/143630 A1 | 10/2013 |
| WO | 2018/158347 A1 | 9/2018 |
| WO | 2019/186181 A1 | 10/2019 |

OTHER PUBLICATIONS

Awtar et al., "Characteristics of Beam-Based Flexure Modules", Journal of Mechanical Design, vol. 129, Issue 6, May 29, 2007, pp. 625-639.

(Continued)

*Primary Examiner* — Balram T Parbadia
*Assistant Examiner* — Gabriel A Sanz
(74) *Attorney, Agent, or Firm* — FisherBroyles, LLP

(57) ABSTRACT

In some examples, a device includes a fluid lens having a substrate and a membrane connected to the substrate using a flexure. The fluid lens may include a fluid located within a cavity at least partially defined by the substrate and the membrane. The flexure may include a membrane attachment and an elastic element. The device may be configured so that a displacement of the membrane attachment adjusts a profile of the membrane, and may induce a compression of at least a portion of the elastic member. In some examples, a flexure may include a plurality of elastic elements, which may be attached to the substrate (e.g., through a flexure support), and a rigid element, that may include or be connected to the membrane attachment. Example devices include head-mounted devices, such as augmented reality or virtual reality devices.

18 Claims, 31 Drawing Sheets

(56) References Cited

U.S. PATENT DOCUMENTS

| | | | |
|---|---|---|---|
| 5,668,620 A * | 9/1997 | Kurtin | G02C 7/085 |
| | | | 351/158 |
| 5,696,521 A | 12/1997 | Robinson et al. | |
| 5,956,183 A | 9/1999 | Epstein et al. | |
| 5,999,328 A | 12/1999 | Kurtin et al. | |
| 7,256,943 B1 | 8/2007 | Kobrin et al. | |
| 8,254,034 B1 | 8/2012 | Shields et al. | |
| 10,634,824 B1 | 4/2020 | Ouderkirk et al. | |
| 2003/0095336 A1 | 5/2003 | Floyd | |
| 2004/0156983 A1 | 8/2004 | Moravec et al. | |
| 2006/0077562 A1 | 4/2006 | Silver | |
| 2006/0163612 A1 | 7/2006 | Kouvetakis et al. | |
| 2007/0279585 A1 | 12/2007 | Bartoli | |
| 2008/0001169 A1 | 1/2008 | Lochtefeld | |
| 2008/0084532 A1 * | 4/2008 | Kurtin | G02C 7/086 |
| | | | 351/57 |
| 2008/0207846 A1 | 8/2008 | Henze et al. | |
| 2008/0239503 A1 | 10/2008 | Conradi et al. | |
| 2008/0257409 A1 | 10/2008 | Li et al. | |
| 2009/0147371 A1 * | 6/2009 | Lee | G02B 3/14 |
| | | | 359/665 |
| 2010/0068866 A1 | 3/2010 | Yu et al. | |
| 2010/0118413 A1 | 5/2010 | Kim et al. | |
| 2010/0176375 A1 | 7/2010 | Lochtefeld | |
| 2010/0182703 A1 | 7/2010 | Bolis | |
| 2010/0252861 A1 | 10/2010 | Lochtefeld | |
| 2011/0085131 A1 | 4/2011 | Gupta et al. | |
| 2011/0085243 A1 | 4/2011 | Gupta et al. | |
| 2012/0041553 A1 | 2/2012 | Gupta et al. | |
| 2012/0287512 A1 | 11/2012 | Egan et al. | |
| 2013/0176628 A1 * | 7/2013 | Batchko | G02B 26/005 |
| | | | 359/665 |
| 2014/0077220 A1 | 3/2014 | Kryliouk et al. | |
| 2014/0253873 A1 | 9/2014 | Crosby et al. | |
| 2014/0261611 A1 | 9/2014 | King et al. | |
| 2015/0055084 A1 * | 2/2015 | Stevens | G02B 3/14 |
| | | | 359/666 |
| 2015/0116656 A1 | 4/2015 | Stevens et al. | |
| 2015/0185480 A1 | 7/2015 | Ouderkirk et al. | |
| 2015/0378067 A1 * | 12/2015 | Stevens | G02C 7/083 |
| | | | 359/666 |
| 2016/0049299 A1 | 2/2016 | Ko et al. | |
| 2016/0223837 A1 | 8/2016 | Holland et al. | |
| 2017/0269378 A1 | 9/2017 | Stevens et al. | |
| 2019/0097080 A1 | 3/2019 | Ide | |
| 2019/0258084 A1 | 8/2019 | Stevens et al. | |

OTHER PUBLICATIONS

Dao et al., "Design and Dynamic Analysis of a Parallel Compliant Vibration Mechanism for High Precision Production Line", International Journal of Innovation and Scientific Research, vol. 8, No. 2, Sep. 1, 2014, pp. 118-123.

Kahrobaiyan et al., "Gravity-insensitive Flexure Pivot Oscillators", Journal of Mechanical Design, vol. 140, Issue 7, Article 075002, May 11, 2018, pp. 1-9.

Lin et al., "Hybrid flexure hinges", Review of Scientific Instruments, vol. 84, Issue 8, Article 085004, Aug. 20, 2013, 15 pages.

Lee et al., "Flexure-based Mechatronic Mobile Sensors for Structure Damage Detection", Proceedings of the 7th International Workshop on Structural Health Monitoring, Sep. 9, 2009, 9 pages.

* cited by examiner

ELASTOMER BASED FLEXURES FOR FLUID LENSES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
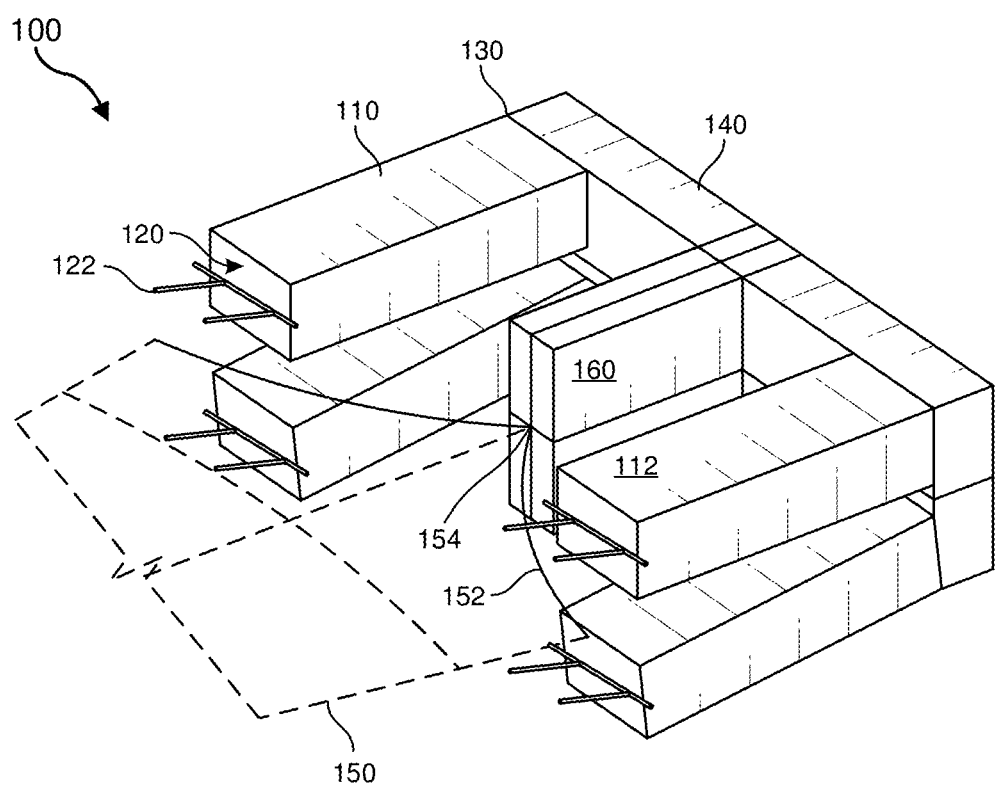
FIG. 1 illustrates an example flexure, in accordance with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to devices including fluid lenses, such as adjustable fluid lenses. Fluid lenses are useful in a variety of applications. Improvements in the performance of such devices would, therefore, be of value in various applications. As will be explained in greater detail below, embodiments of the present disclosure may be directed to devices and systems including fluid lenses, methods of device fabrication, and methods of device operation. In some examples, such devices may include eyewear devices, such as spectacles, sunglasses, eye protection devices, augmented reality (AR) devices, virtual reality (VR) devices, and the like. Embodiments of the present disclosure may also include devices having one or more fluid lenses and a waveguide display assembly.

Adjustable fluid lenses are useful for ophthalmic, VR, and AR devices. In some example AR and/or VR devices, fluid lenses may be used for the correction of what is commonly known as the vergence accommodation conflict (VAC). Examples described herein may include such devices, including fluid lenses for the correction of VAC. Examples disclosed herein may also include fluid lenses, membrane assemblies (which may include a membrane and, e.g., a peripheral structure such as a support ring or a peripheral wire), and devices including one or more fluid lenses and waveguide display assemblies configured to provide augmented reality image elements.

A fluid lens may include an actuation mechanism that significantly increases membrane strain during actuation of the lens. This may, in turn, increase the required actuation force. As an example, a simple fixed perimeter eye wire deflector commonly used in fluid lens designs may require 10 times or more force to distort the membrane than is required to move the fluid in the lens.

In some examples, actuation mechanisms described herein may use a zero-strain actuation profile in which the membrane profile may be adjusted without significant change in the elastic strain energy of the membrane. In a zero-strain actuation profile, the control points of the membrane may follow a predetermined trajectory, while also restraining the substantial force due to the tension in the membrane. In some examples, a control point may be a location at or proximate the periphery of the membrane, having a location that may be adjusted, in some examples by movement of a proximate membrane attachment. A membrane attachment may include a mechanical element attached to the membrane at or proximate a control point. In some examples, the membrane attachment may be connected to, or otherwise interact with, a support structure, such as a flexure. In some examples, a support structure may include a membrane attachment. In some example applications, there may only be a restricted space for membrane adjustment components, and compact (and, e.g., low-cost) device configurations, such as devices including flexures, may be preferable.

Embodiments described herein may include adjustable fluid lenses including a substrate and a membrane, at least in part enclosing a lens cavity. The lens cavity may also be referred to hereinafter as a "cavity" for conciseness. The cavity may enclose a lens fluid (sometimes herein referred to a "fluid" for conciseness), and the interior surface of the cavity may be proximate or adjacent the lens fluid.

Figure 5:
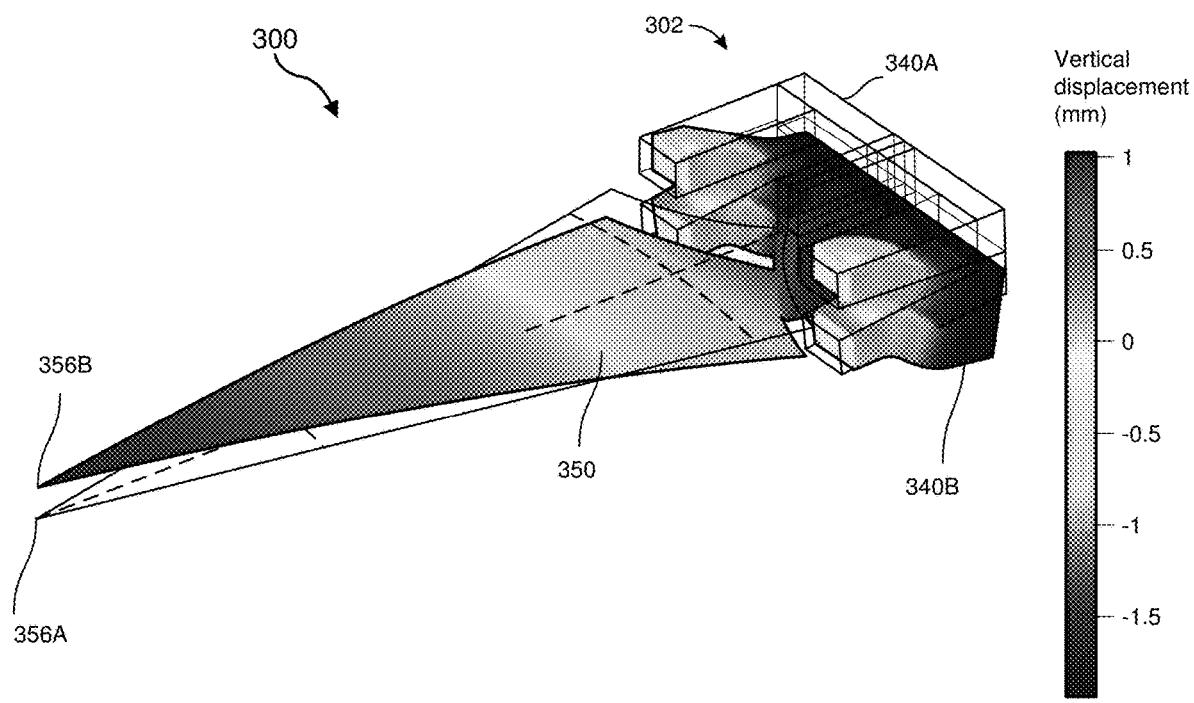
FIG. 5 illustrates representative deformations of membrane and flexure on actuation of an example flexure.
Figure 6:
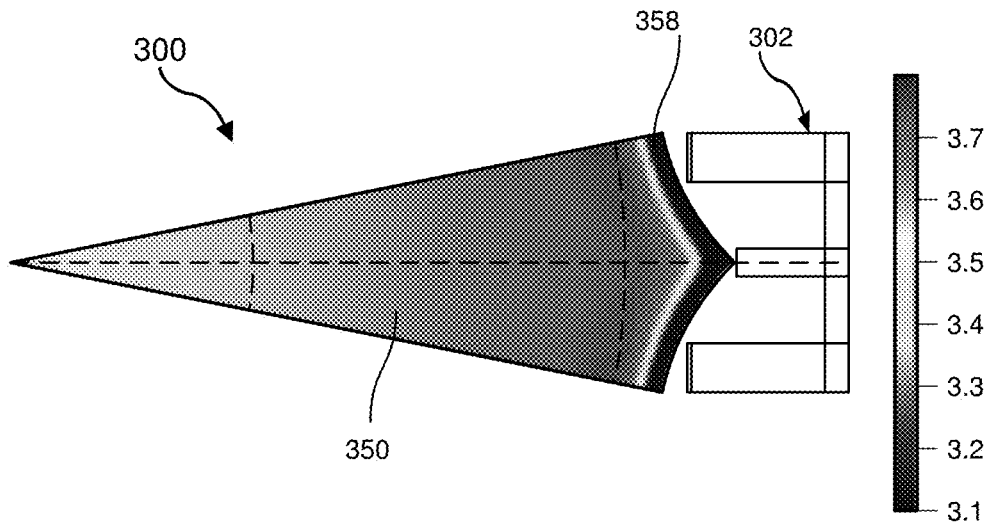
FIG. 6 shows the spatial distribution of optical power of an example fluid lens.
Figure 31:
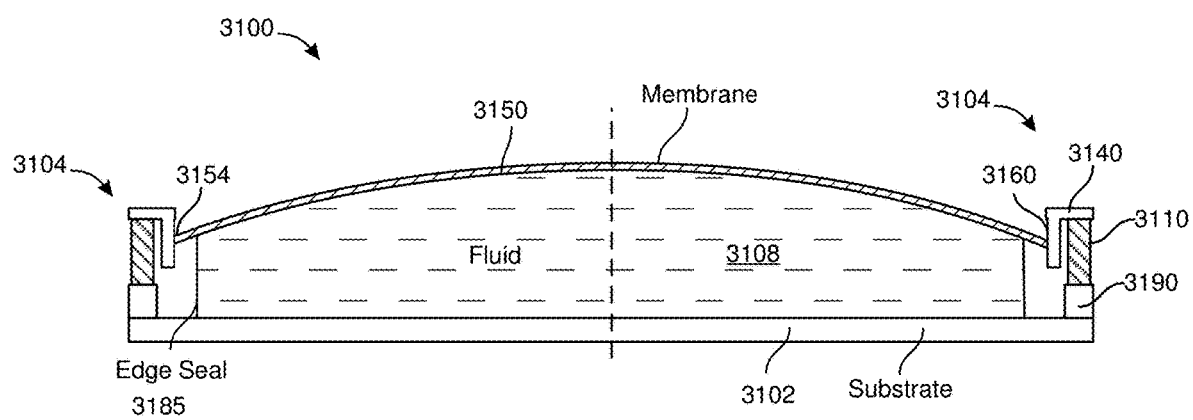
FIG. 31 illustrates an example fluid lens include flexures, in accordance with embodiments of this disclosure.
Figure 32:
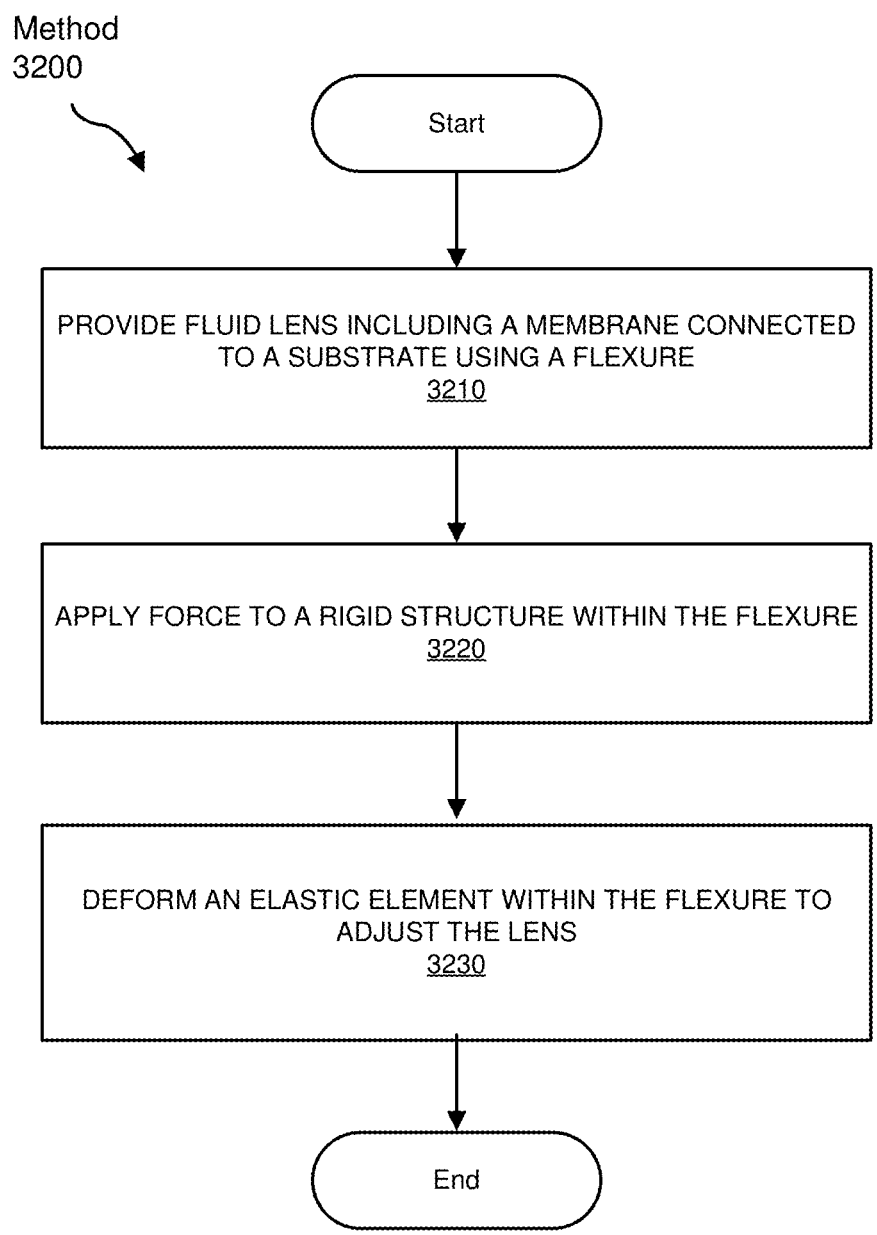
FIGS. 32-33 illustrate example methods, in accordance with embodiments of this disclosure.
Figure 33:
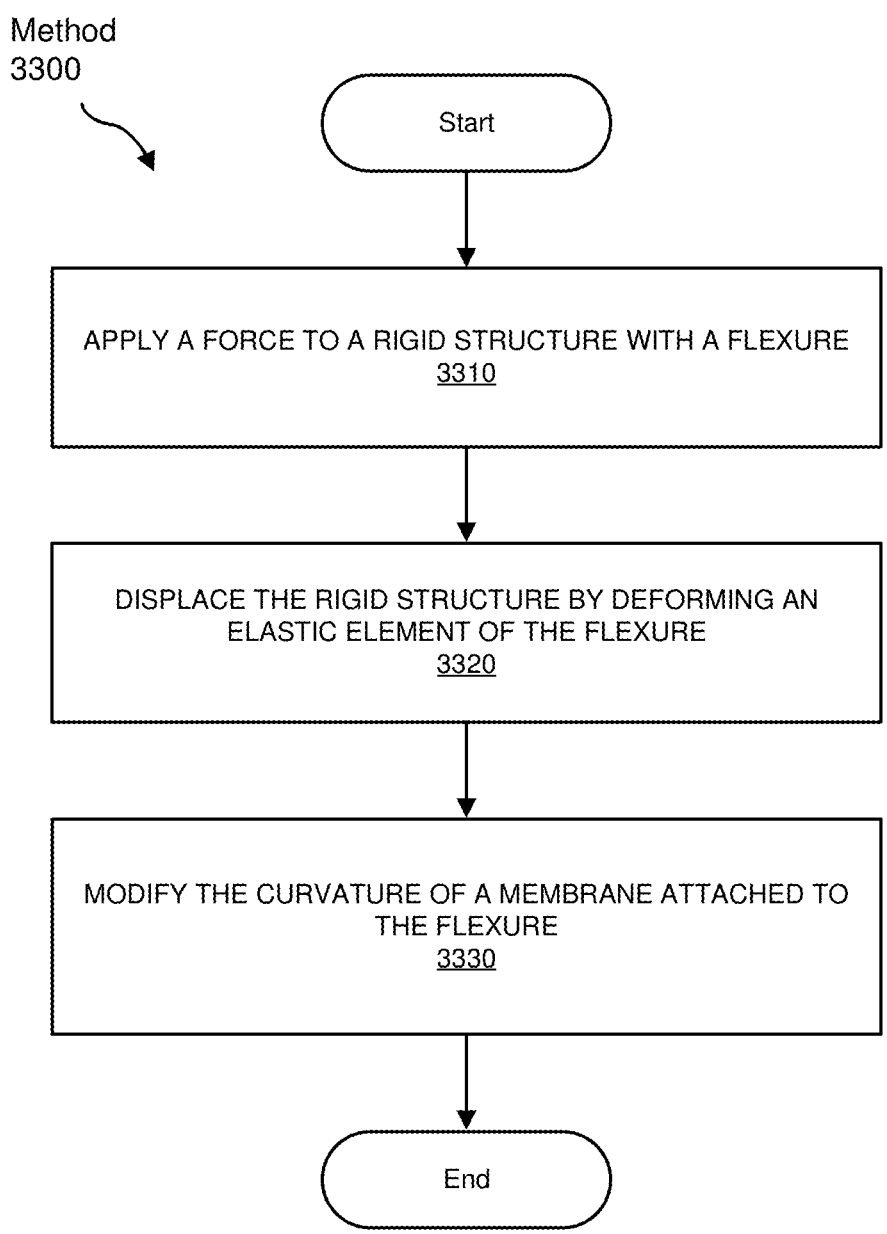
Figure 34:
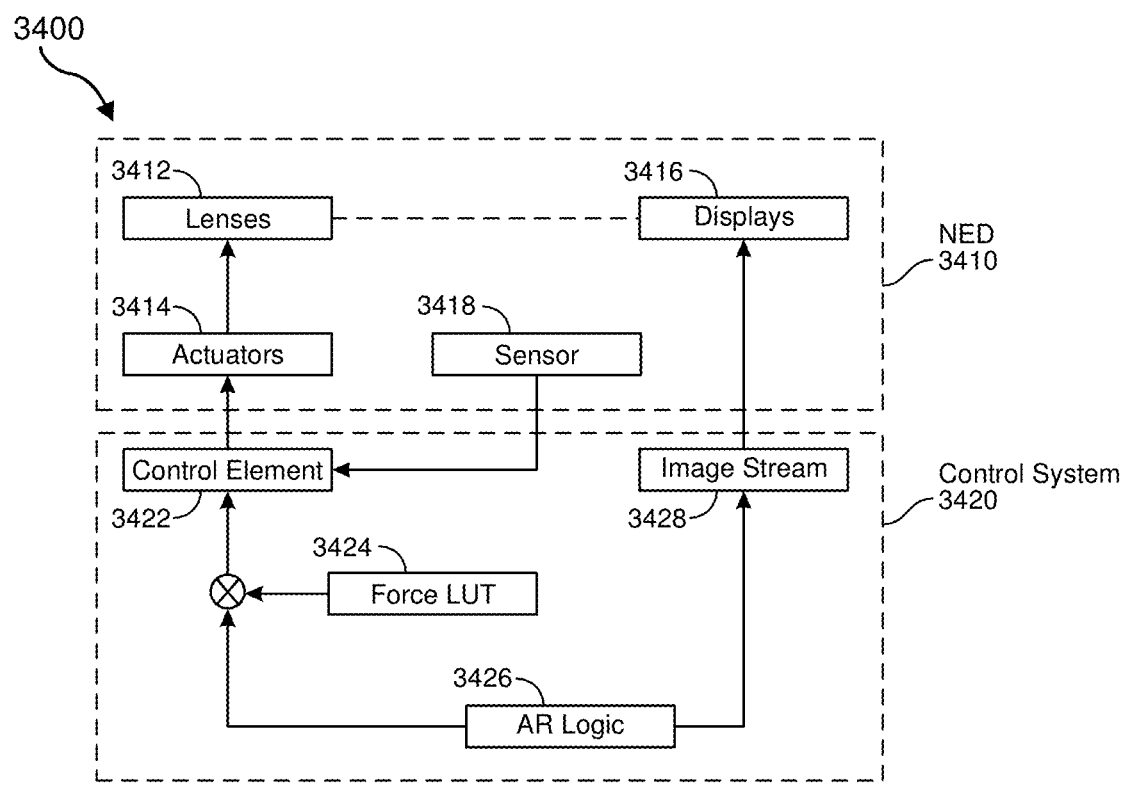
FIG. 34 shows an example control system that may be used in connection with embodiments of this disclosure.
Figure 35:
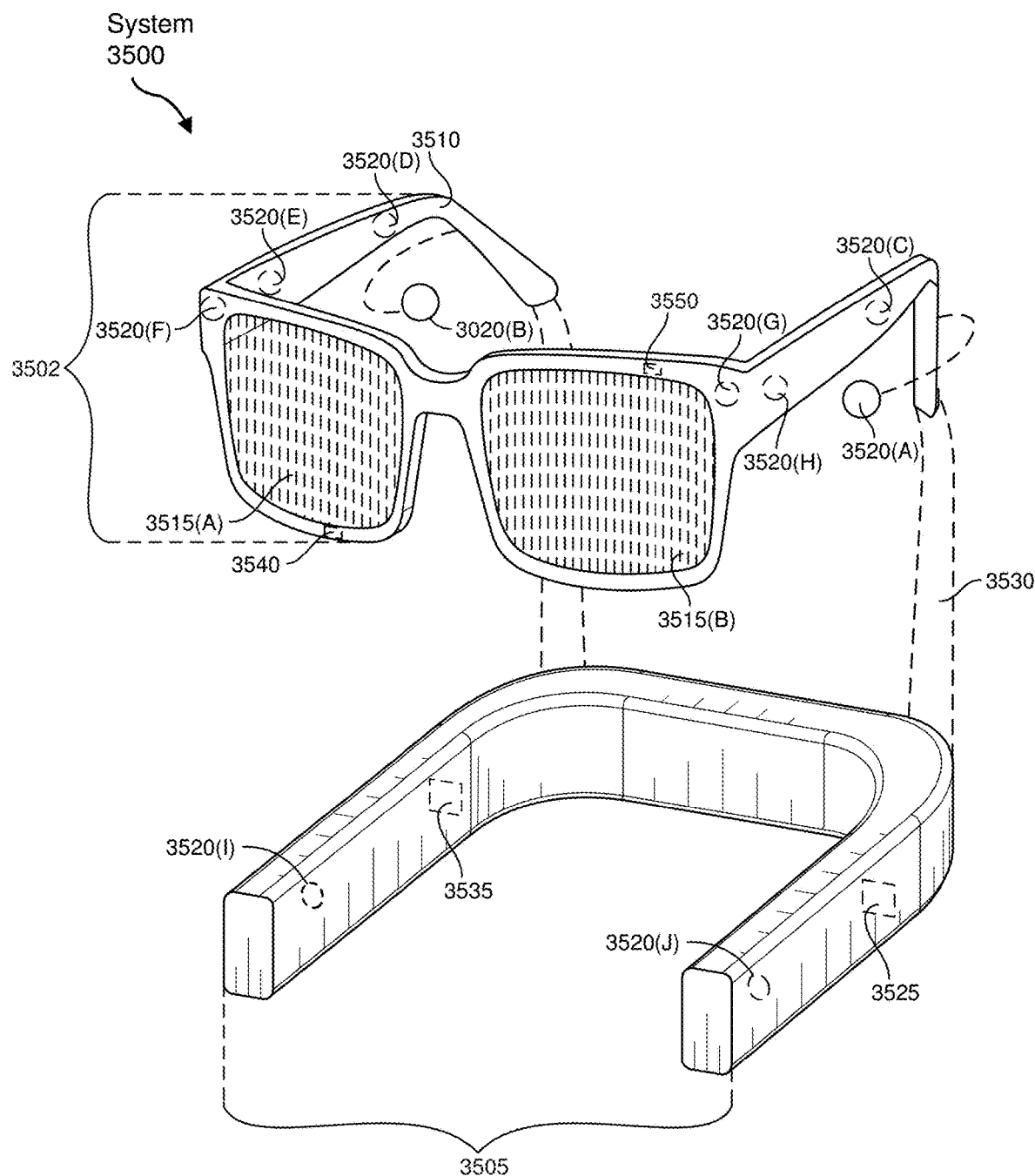
FIG. 35 is an illustration of exemplary augmented-reality glasses that may be used in connection with embodiments of this disclosure.
Figure 36:
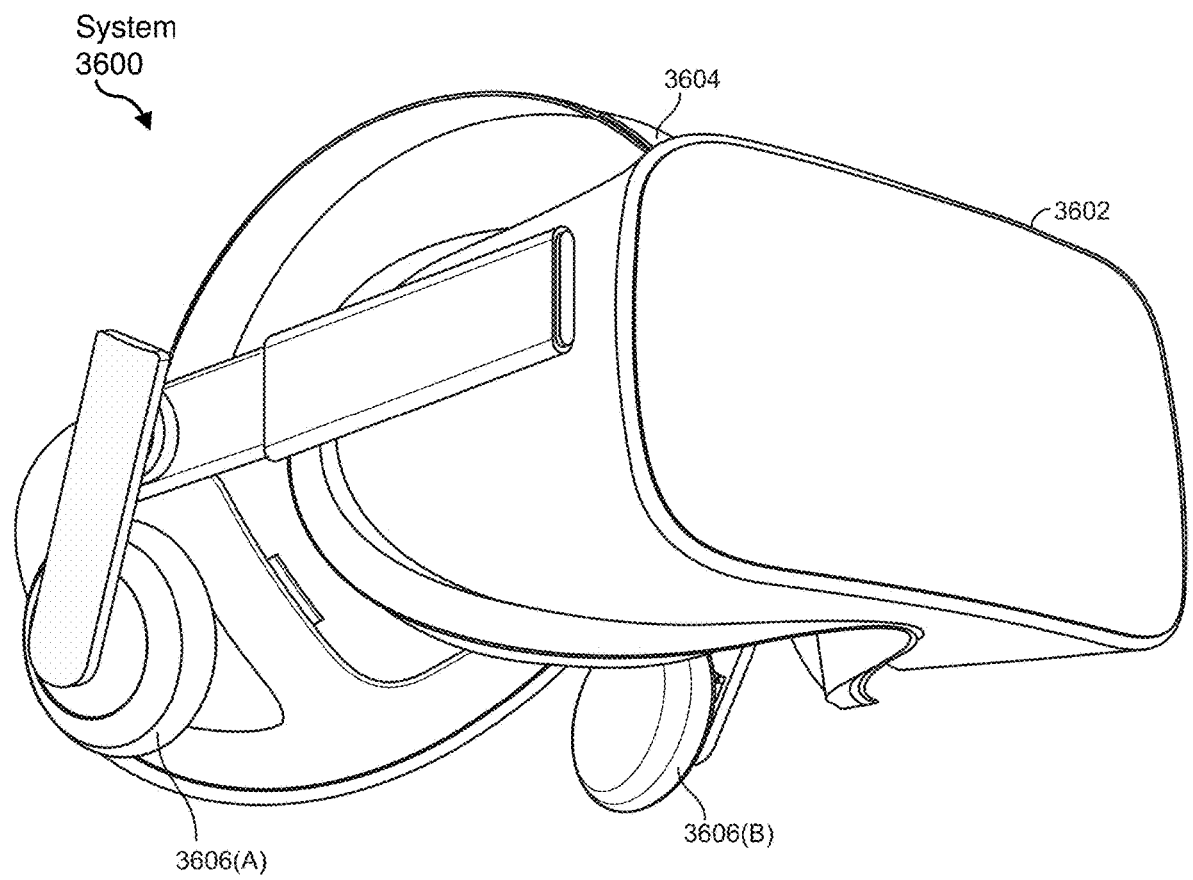
FIG. 36 is an illustration of an exemplary virtual-reality headset that may be used in connection with embodiments of this disclosure.

The following will provide, with reference to FIGS. 1-36, detailed descriptions of such devices, fluid lenses, optical configurations, methods, and the like. FIGS. 1-4 describe example flexure configurations. FIGS. 5-6 illustrate representative changes in the membrane profile. FIGS. 7-17 illustrate, for example, displacement effects on the elastic elements and other lens properties, including the spatial distribution of stress and strain within the elastic elements. FIGS. 18A-18B show optical power and cylindricity versus displacement. FIGS. 19-25 illustrate further flexure examples. FIGS. 26-30 illustrate, for example, displacement effects on the properties of a flexure or membrane. FIG. 31 illustrates an example fluid lens. FIGS. 32-33 illustrate example methods. FIG. 34 shows an example system. FIGS. 35-36 illustrate example augmented reality and/or virtual reality devices, which may include one or more fluid lenses used in connection with embodiments of this disclosure.

Features from any of the embodiments described herein may be used in combination with one another in accordance with the general principles described herein. These and other embodiments, features, and advantages will be more fully understood upon reading the following detailed description in conjunction with the accompanying drawings and claims.

Examples include a fluid lens including an elastomer component, such as a flexure including an elastic element. In some examples, the flexure may mechanically couple the membrane to a substrate. In some examples, a fluid lens with an elastic membrane may require a large amount of energy to distort the membrane using a simple motion. In this context, a simple motion may be one where the periphery of the membrane (e.g., controlled at or proximate one or more control points) is moved parallel to the average normal vector of the membrane (e.g., normal to the direction of elastic force exerted by the membrane on the flexure at a control point). In some examples, actuation of a fluid lens may include moving control points of the outer edge of the membrane along a predefined trajectory, which may be termed an actuation trajectory, or a guide trajectory. The guide trajectory (of the control point, or, e.g., of a membrane attachment) may be configured so that the guide trajectory remains normal to the direction of the elastic tension force from the membrane. The guide trajectory may be configured so that the elastic energy of the membrane remains approximately constant as the control point moves along the guide trajectory.

Examples also include a fluid lens including a flexure, including at least one elastic element, that allows motion of a control point of a membrane along a desired predefined guide trajectory. Advantages of example flexures may include one or more of the following; low resistance force, long life, a small volume, and/or a small cross-sectional area.

In some examples, a fluid lens includes a membrane in tension, where the tension is restrained by a flexure that includes an elastic element. In some examples, at least a portion of the elastic element is in compression. The membrane may be a transparent elastic membrane.

In some examples, a fluid lens includes a first and a second elastic element that are proximate to each other, where each elastic element has a first and a second approximately opposed face, where the first faces are attached to a first surface, and the second faces are attached to a common structure, which is connected to at least a portion of the membrane. The membrane may be a transparent elastic membrane. The first and the second elastic elements may be elongated, and may be generally parallel to each other. In some examples, the first and second elastic elements may be at an angle of between 0 and 20 degrees of each other, such as between 1 and 15 degrees of each other, for example, between 1 and 10 degrees, such as between 3 and 10 degrees of each other.

In some examples, the elastic element may include an elastomer, and the elastic element may include one or more of the following: a natural rubber, a synthetic rubber (e.g., a nitrile rubber), or one or more other elastomers.

In some examples, a fluid lens includes flexure having a first and a second elastic element, where the first and second elastic elements have a first and a second face, where the first faces are connected to a first surface, and the second faces are connected to a second surface, where there is a first and a second elastic element are proximate to each other, where each elastic element has a first and a second approximately opposed face, where the first faces are attached to a first surface, and the second faces are attached to a common structure, to which a force is applied in at least one direction. In some examples, the first and the second elastic elements are parallel to each other. In some examples, the first and the second elastic elements are at an angle of between 0 and 20 degrees of each other, such as between 1 and 15 degrees of each other, for example, between 1 and 10 degrees, such as between 3 and 10 degrees of each other. The elastic element may include one or more of the following: a natural rubber, a synthetic rubber (e.g., a nitrile rubber), or one or more other elastomers.

A membrane may have one or more control points, where a control point may be at or proximate a membrane attachment that provides a point of attachment of the membrane to a support structure. The support structure may allow the height of the membrane (e.g., the distance from the substrate) and radial distance (e.g., distance to the optical center of the lens) to follow a predetermined guide trajectory. In some examples, a control point may be provided by a membrane attachment that is part of, is attached to, or otherwise interacts with, a support structure such as a flexure. In some examples, the location of a control point of the membrane may be determined by a membrane attachment portion of the flexure. In some examples, the membrane attachment may be connected to, or part of, a rigid element of the flexure.

In some examples, a support structure, such as a flexure, may include one or more elastomers. Elastomers may include, for example, natural rubber, nitrile rubber, polyolefin rubbers (e.g., butyl rubber), silicone rubber, and acrylate elastics. Elastomers may include, for example, thermoplastic elastomers or thermoset elastomers. An example elastomer may include one or more additional components, such as one or more components that stiffen the elastomer as a whole, or stiffen specific regions of the elastomer. An additional component may modify the mechanical properties of the elastomer, for example, isotropically (e.g., a particulate component, such as carbon black), or anisotropically (e.g., a fiber component such as carbon fiber, which may include aligned fibers).

A fluid lens may include one or more elastomer components and one or more rigid components. In this context, a rigid component (such as a rigid element, a rigid arm, or other non-elastomer component) may include a material that is substantially stiffer than the elastomer, and may include, for example, one or more polymers (e.g., plastics) such as polycarbonate, nylon, polyesters including polyethylene terephthalate, polyetheretherketone, polystyrene, epoxies, or other polymers. A rigid component may include one or more metals, such as steel, aluminum, or titanium. A rigid component may include a glass, ceramic, or other inorganic component. A rigid component may include a composite, for example, a composite including one or more polymers and one or more other components.

FIG. 1 shows a flexure 100 including an elastic element, in this example, a flexure arm 110 that has a first end 120 and a second end 130. The first end 120 of the flexure arm 110 may be fixed (e.g., in position relative to the lens substrate), and may be attached to a flexure support (not shown). The flexure support may be a rigid support attached, for example, to the fluid lens substrate (not shown in this figure), and the ends of one or more flexure arms. The second end 130 of the flexure arm is connected to a rigid element 140, which includes a rigid arm 160 attached to a membrane 150 at a control point 154 of the membrane 150. In some examples, the rigid element may be a unitary structure including the rigid arm. The membrane 150 may be a transparent elastic membrane, which may have an adjustable profile in the fluid lens.

The connector 122 represents a connection between the flexure arm 110 and a flexure support (not shown). The flexure support (not shown) may rigidly attach the first end 120 of the flexure arm 110 to the substrate of a fluid lens including the flexure, as discussed further below.

The figure shows the periphery 152 of the membrane 150, which in this case is a scalloped edge. The scalloped edge arises due to the combination of the elastic properties of the membrane and the finite number of control points. A representative segment portion of the membrane is shown, and modeling of a flexure properties may use such a representative segment of the membrane. Radial and circumferential dashed lines are included for illustrative purposes. For example, the radial dashed line may extend between the control point of the membrane, at the end of the rigid arm 160, and the center of the lens (not shown).

The elastic element, in this example the flexure arm 110, may include an elastomer, such as a natural or synthetic rubber. The flexure shown in FIG. 1 shows four elastic elements, arranged in two spaced-apart pairs. The first pair of elastic elements includes flexure arm 110, and the second pair of elastic elements includes a second flexure arm 112. The rigid element 140 extends between the first and second pair of flexure arms and provides a membrane attachment, for example, as a portion of the rigid arm. In this example, the rigid element 140 is located between the first and second pairs of elastic elements. Each pair of elastic elements may be generally parallel. In some examples, the angle between each elastic element of a pair of elastic elements may be between 0 and 15 degrees, such as in the range 1-10 degrees, for example, 3-10 degrees.

The profile of the membrane 150, for example, the curvature, and the associated optical power of a fluid lens, may be adjusted by displacing the control point, for example, relative to the substrate of the fluid lens. If the control point is adjusted generally downwards, which may be towards the substrate, the center of the membrane may move away from the substrate, particularly if the volume of the fluid is conserved during membrane adjustment.

Figure 2:
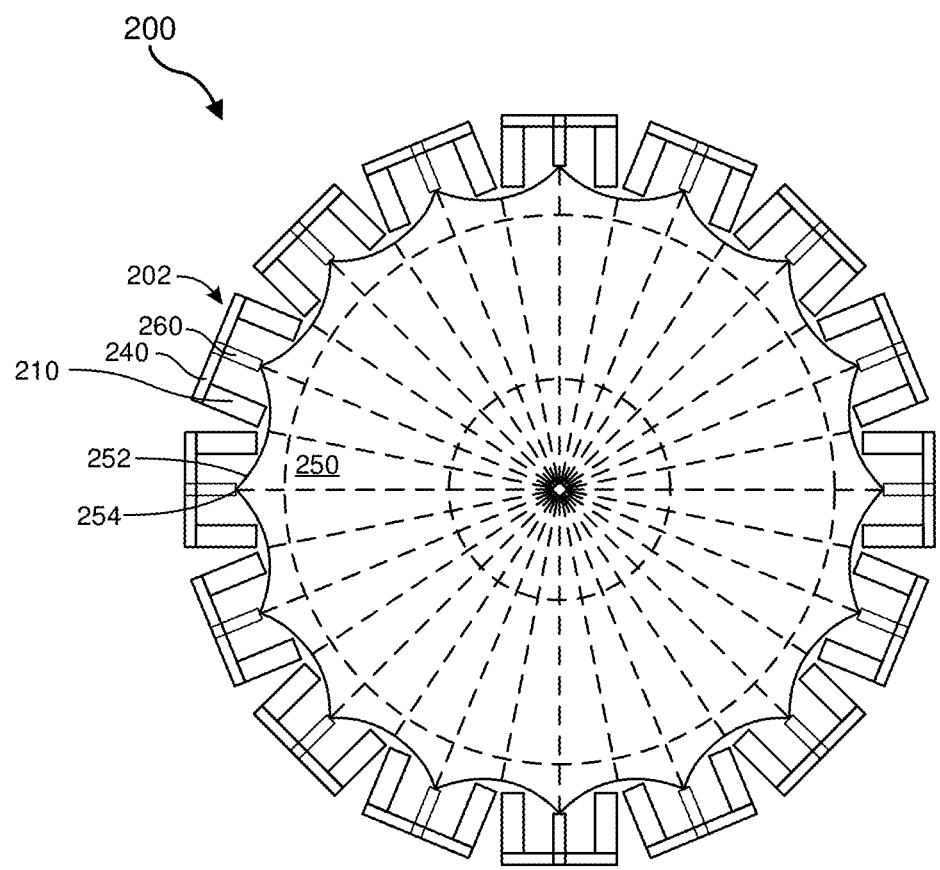
FIG. 2 shows an arrangement of a plurality of flexures around a fluid lens, in accordance with embodiments of this disclosure.

FIG. 2 shows a fluid lens 200, including an array of flexures 202 arranged around the periphery of a membrane 250, and supporting the membrane. Each flexure 202 may include a plurality of elastic elements such as elastic element 240 (which in this example may be described as a flexure arm), and a rigid element 240 including a rigid arm 260 that provides the membrane attachment. The membrane 250 may have a periphery 252 in the form of a scalloped edge. The profile of the membrane may be controlled through control points 254. The membrane 250 is attached to the membrane attachment of the flexure at the control point 254, in this example located at the end of the rigid arm 260. In this example, the rigid arm 260 provides the membrane attachment. The dashed lines within the membrane represent approximate radial and circumferential directions within the membrane, with the illustrated radial directions extending from the lens center to the control points.

In some examples, a peripheral support, such as a tensioned wire, may extend around the periphery of the membrane. The control points of the membrane may be attached to the peripheral support. The membrane may be attached to the peripheral support for at least a portion of the extent of the peripheral support between the control points. In some examples, a peripheral support such as a tensioned wire may have an arcuate shape between control points.

The control points may be displaced either directly or indirectly using an actuator. For example, a fluid lens may include a motor-rotated cam surrounding the perimeter of the outer portions of the circular arrangement of flexures shown in FIG. 2, and the cam may displace the flexures by a desired amount.

Figure 3:
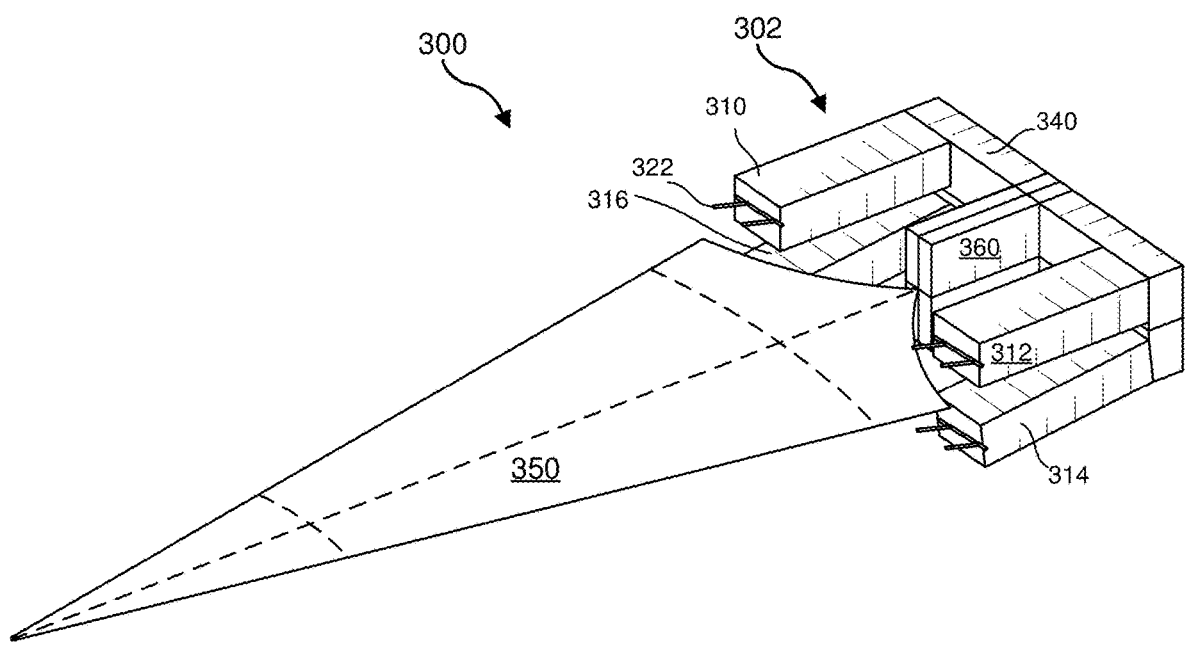
FIG. 3 illustrates a portion of a fluid lens including a flexure, which may be modeled, in accordance with embodiments of this disclosure.

FIG. 3 shows a segment of an example fluid lens 300, including a flexure 302 having elastic elements in the form of flexure arms (310, 312, 314, 316), and a rigid element 340 including a rigid arm 360. The flexure 302 may be similar to the flexure 100 illustrated in FIG. 1. The flexure arm 310 is connected to the rigid element 340. The rigid arm 360 may also be referred to as a membrane support arm, and provides the membrane attachment to which the membrane 350 is attached. The illustrated segment of the membrane 350 is connected to the rigid arm 360 at a control point located at the end of the rigid arm 360. In this example, the flexure arms may interconnect the rigid element and the flexure support (not shown, but the connector between the flexure arm and the flexure support is shown at 322).

The flexure support may provide a generally rigid attachment of one end of each flexure arm to the substrate of the lens (not shown in FIG. 3). Each flexure arm provides an elastic element that flexibly interconnects the flexure support (or substrate) and the rigid element, and hence helps provide a flexible mechanical connection between the substrate and the membrane attachment.

The example flexure 302 includes four elastic elements, which in this example may also be referred to as flexure arms. The flexure 302 includes a first pair of elastic elements 310 and 316, and a second pair of elastic elements 312 and 314. As illustrated, the elastic elements 310 and 312 are upper elastic elements (also referred to as upper flexure arms), and the elastic elements 314 and 316 are lower elastic elements (also referred to as lower flexure arms). The rigid arm 360 (that provides the membrane attachment in this example) is located between the spaced apart pair of elastic elements.

A generally elongated elastic element may be referred to as a flexure arm. In this example, the flexure arms are shown as having a generally square cross-section, but this is not limiting, and the form of the elastic element may have any appropriate shape (e.g., a cuboid such as a rectangular or square prism, a cylinder, any prism, tube, or any other appropriate shape). In some examples, the elastic elements may be arranged as two spaced-apart pairs of elastic elements.

In FIG. 3, the illustrated segment of the membrane 350 represents a portion of the membrane of the fluid lens. The lens fluid may occupy a cavity (e.g., an enclosed fluid volume) enclosed by an interior surface of the membrane and a substrate (not shown). The properties of such an example lens system were modeled in an example lens configuration using typical material properties, as discussed further below. The membrane may be modeled as a shell-like membrane. A volume constraint equation may be used to compute the applied pressure and to adjust the height at which the membrane is flat. The segment of the membrane that was modeled represents one-sixteenth of an approximately circular membrane, and symmetry boundary conditions may be used in the model.

Figure 4A:
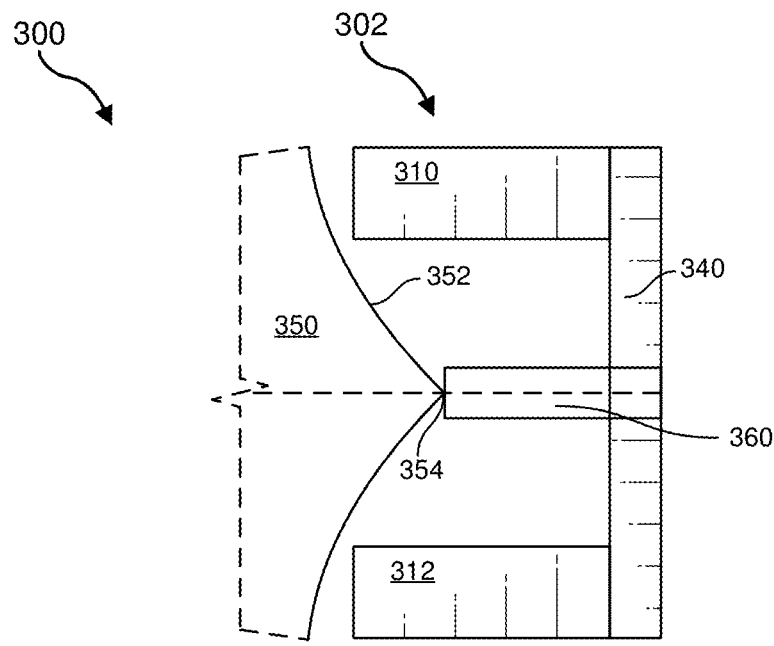
FIGS. 4A and 4B show top and side views of a flexure configuration, in accordance with embodiments of this disclosure.

FIG. 4A show a top view of an example flexure supporting a control point of the membrane. The flexure may be similar to the flexure 302 shown in FIG. 3, and is labelled in a similar manner. The fluid lens 300 includes a flexure 302 having flexure arms 310 and 312, a rigid element 340 including rigid arm 360, and a segment of the membrane 350 is shown with periphery (or edge) 352. The membrane 350 is attached to the rigid arm 360 at the control point 354. The control point 354 is a location on the periphery 352 of the membrane 350, the control point being where the periphery 352 of the membrane is attached to the flexure, in this example to the end of the rigid arm 360. The dashed line represents the radial direction from the lens center through the control point and into the rigid arm. FIG. 4A shows an example approach, and dimensions may be adjusted for system optimization, or for alternative designs. In some examples, the rigid arm may include a metal, such as aluminum, steel, or other metal or alloy thereof, or a polymer.

Figure 4B:
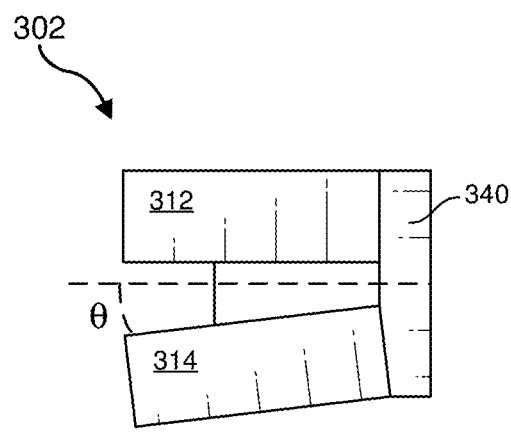

FIG. 4B shows a side view of a pair of flexure arms 312 and 314, which may be denoted upper and lower flexure arms, respectively. The upper flexure arm is generally normal to the rigid element 340. Flexure arm 310 in FIG. 4A may also be termed an upper flexure arm, and may have a lower flexure arm below it (and not shown in the top view of FIG. 4A). In some examples, the lower flexure arm may have a lower flexure arm angle, here denoted θ, and this angle is also the angle between the upper and lower flexure arms, which may be termed a flexure angle. In some examples, a flexure may include first and second spaced apart pairs of elastic elements, such as flexure arms, and the pairs of elastic elements (e.g., flexure arms 312 and 314) may have a flexure angle between them. The trajectory of a membrane control point may be adjusted by adjusting the flexure angle, for example, by adjusting the upper flexure angle (zero in the illustrated example, and/or the lower flexure angle (denoted θ in this example).

The dimensions of the flexure arms, and/or the value of the flexure angle, may be adjusted to modify the trajectory of the associated control point, for example, as discussed further below in relation to FIG. 15. For example, in some examples, the flexure arms or elastic elements may have a length of between 2 mm and 10 mm, an edge length (e.g., of a square or rectangular cross-section) of between 0.5 mm and 5 mm. The flexure angle (e.g., between a pair of elastic elements as shown in FIG. 4B) may be between 0 and 15 degrees (where 0 degrees represents parallel elastic elements), such as between 0 and 10 degrees, for example, between 1 and 10 degrees. The separation of the two pairs elastic elements (e.g., center to center, average if parallel, e.g., as shown in FIG. 4A) may be between 5 mm and 15 mm.

One or more control points of a fluid lens may be displaced either directly or indirectly using an actuator. For example, a fluid lens may include a motor-rotated cam surrounding the perimeter of the outer portions of the arrangement of flexures.

FIG. 5 shows an actuated lens, with shading that indicates the displacement of the lens components. The lines show the original location of lens components. Upon actuation, the height of the membrane increases monotonically toward the center, providing a near-spherical lens shape. As illustrated, the membrane in the actuated configuration is appreciably above the original (non-actuated) position near the center of the lens.

The figure shows a flexure generally at 302. The rigid element is shown in the original (non-actuated) position by a line drawing at 340A, and in the actuated position by a shaded representation at 340B. The rigid element 340A is shown as an engineering line drawing that may include vertices and edges that would be hidden from view if the rigid element were fabricated from an opaque material. The rigid element moves downwards, as illustrated, in the negative direction (in the convention used in this example), towards the lens substrate (not shown). The flexure 302 is connected to the membrane 350. Only a segment of the membrane is represented, which may be the segment controlled by the corresponding flexure shown in the figure. The center of the lens, and of the membrane, is shown in the original (non-actuated) position at 356A, and moves upwards to the actuated position 356B when the lens is actuated. If the periphery of the membrane is adjusted generally downwards (as illustrated), which may be towards the substrate, the center of the membrane may move away from the substrate, particularly if the volume of the fluid is conserved during membrane adjustment.

FIG. 6 shows the optical power of the fluid lens 300 in diopters over the extent of the membrane. The figure shows the flexure 302 connected to the segment of the membrane 350. The dashed line show radial and circumferential directions. The radial direction shown extends from the center of the lens to the control point 354 at the flexure.

The shading of the membrane segment is based on the spatial variation of optical power. In this example, the optical power of the lens is approximately 3.5 diopters, with for a flexure displacement of 1.5 mm. The optical power of the lens is reduced proximate the scalloped periphery 352 of the membrane. In this peripheral region 358, having slightly darker shading, the optical power is approximately 3.1-3.3. However, the overall optical properties of the lens are likely to be excellent.

Figure 7:
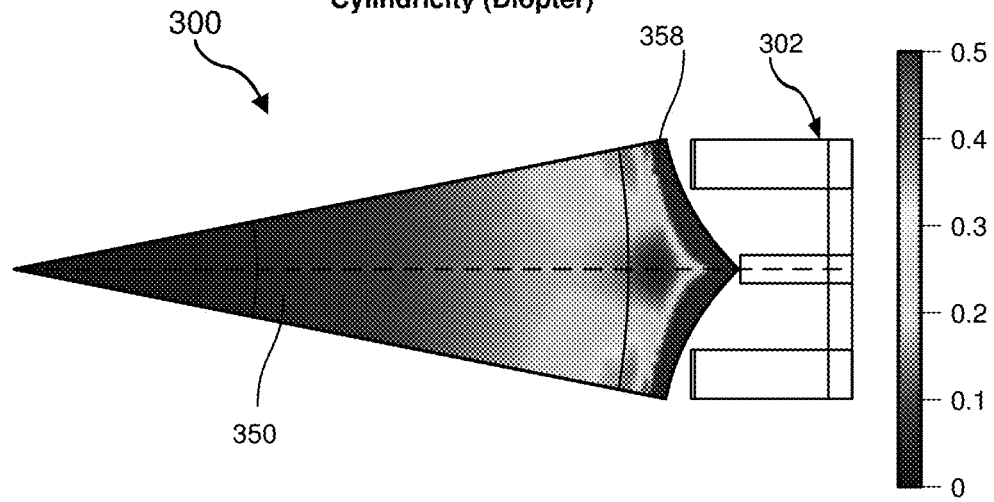
FIG. 7 shows the spatial distribution of cylindricity of an example fluid lens.

FIG. 7 shows the cylindricity of the lens 300, for the same displacement of 1.5 mm. Over most of the area of the lens, the cylindricity is less than 0.2. There is a peripheral region 358 of increased cylindricity proximate the periphery 352 of the membrane, the periphery in this example being a scalloped edge of the membrane. In the peripheral region 358, a small fraction of the lens area, the cylindricity may approach 0.5. Both the optical power and the degree of cylindricity are at values that meet the requirements for ophthalmic applications. In some examples, the peripheral region 358 may be shielded, so that only the non-peripheral region is used in the fluid lens application.

Figure 8:
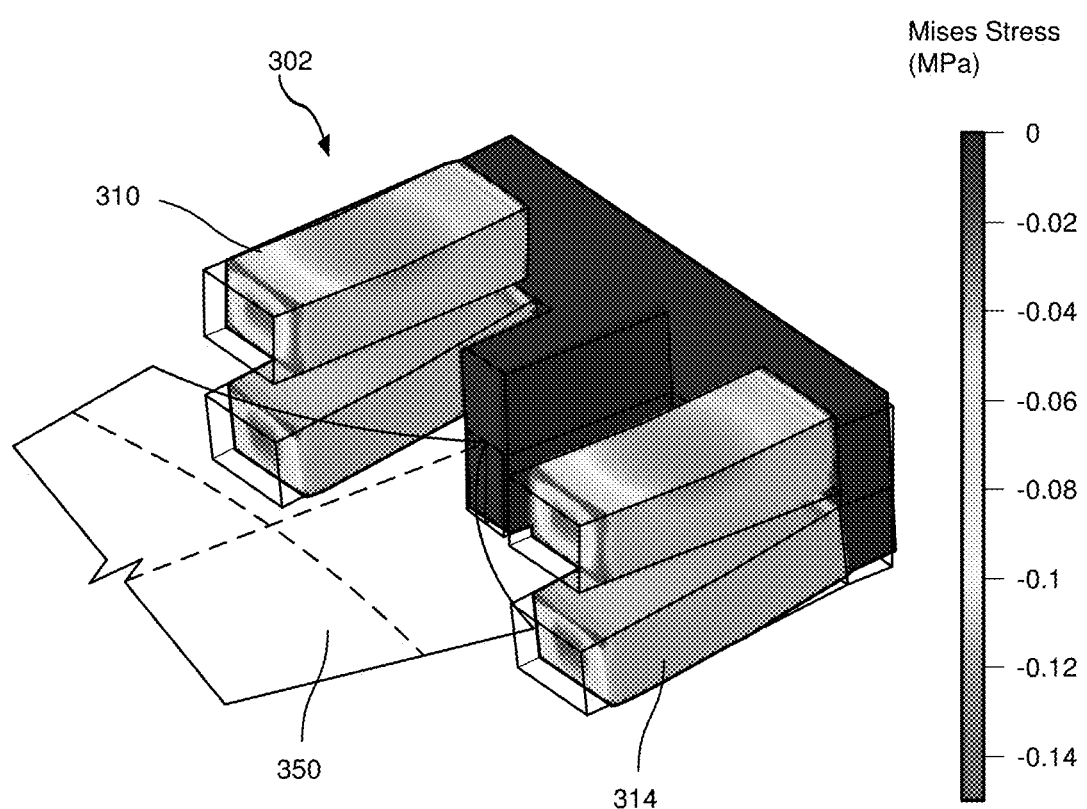
FIG. 8 shows the distribution of stress within elastic elements.

FIG. 8 shows the flexure 302, including a pair of upper flexure arms including flexure arm 310, and a pair of lower flexure arms including flexure arm 314. The figure shows the stress distribution within the flexure arms. The stress within the rigid element may be neglected.

Figure 9A:
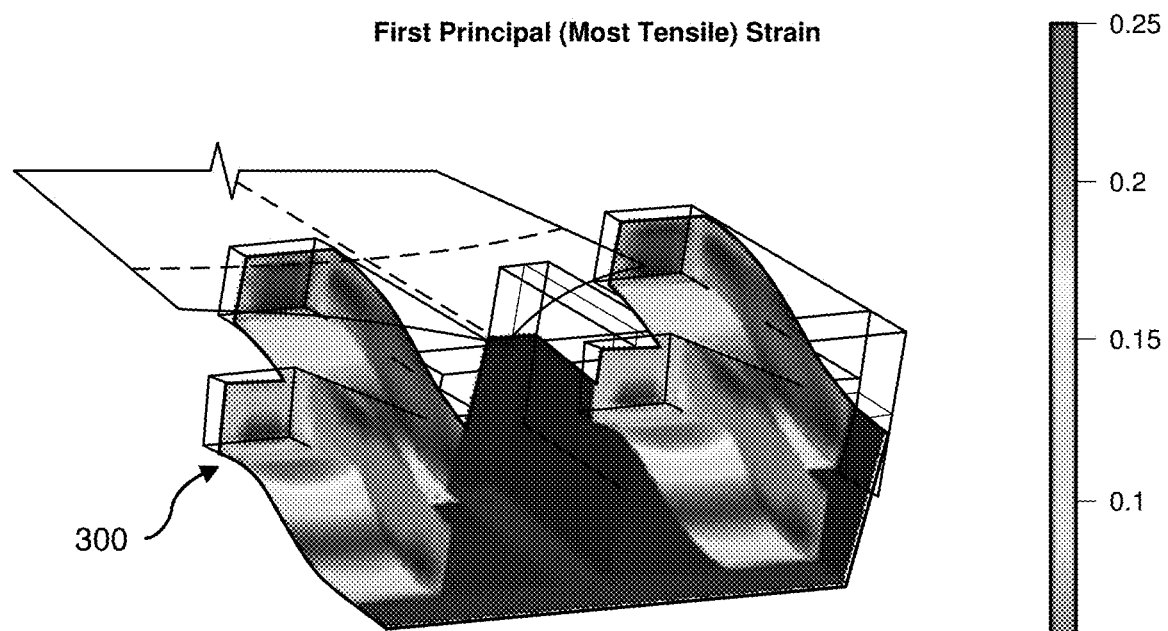
FIGS. 9A-9D show the distribution of tensile and compressive strain within elastic elements.
Figure 9B:
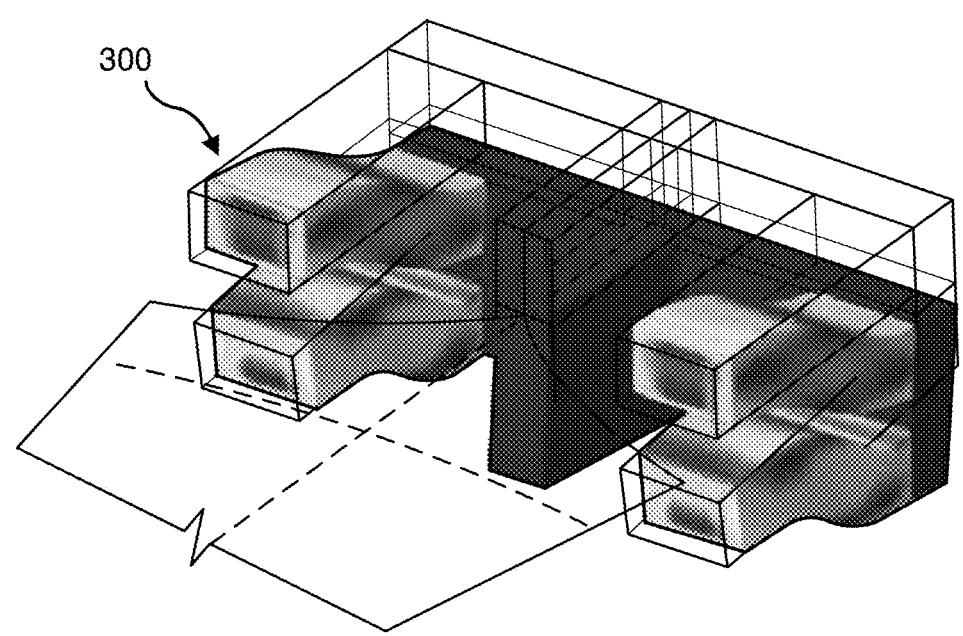
Figure 9C:
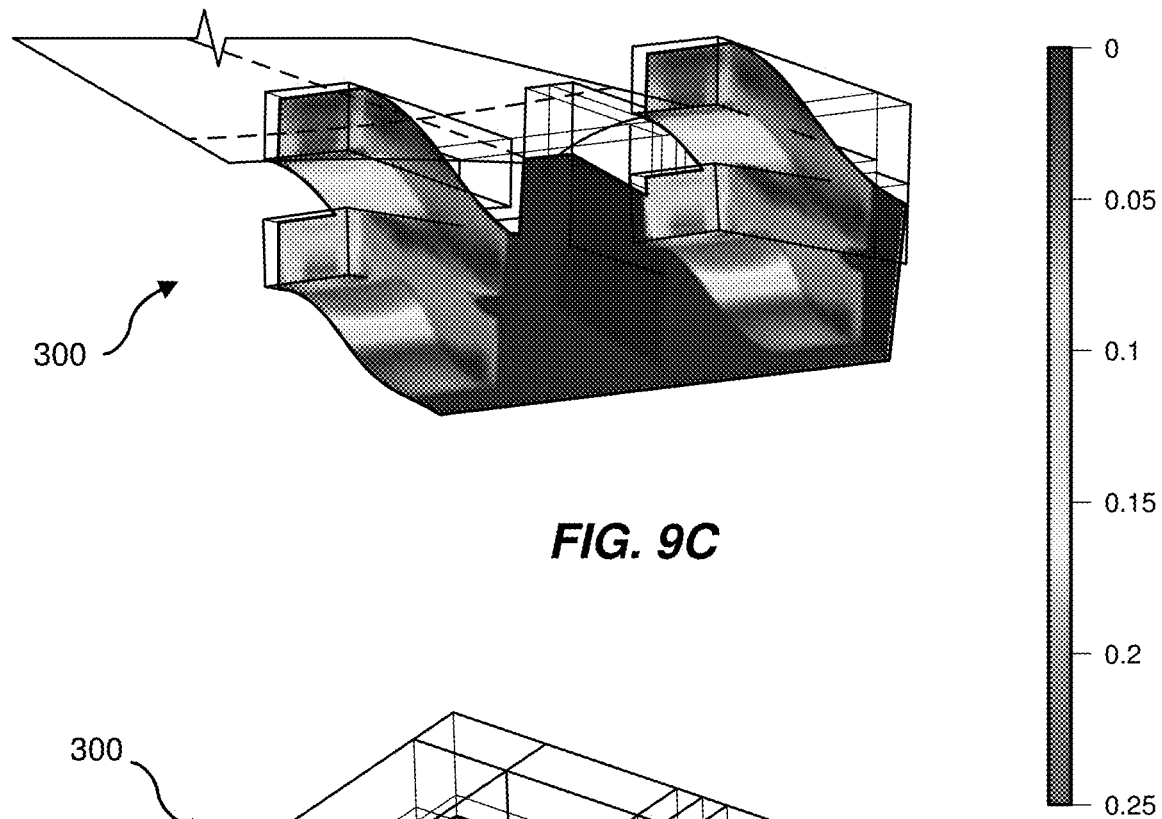
Figure 9D:
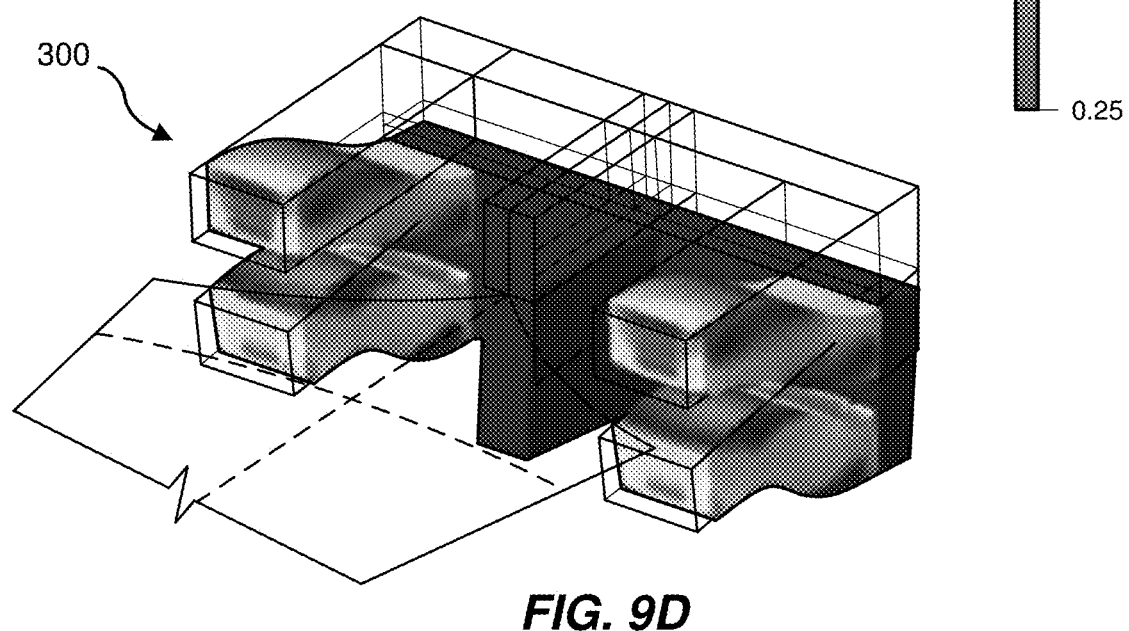

FIGS. 9A-9D show the spatial distribution of stress in the flexure arms of the example flexure 302. The line outlines show the original (non-actuated) location of the flexure. The shaded representations generally indicate the deformed (actuated) states. FIGS. 9A-9B shows the first principal (most tensile) strain within the elastic components of the flexure. Only the elastic components are shown shaded in this representation. FIGS. 9C-9D shows the third principal (most compressive) strain. On actuation of the fluid lens, the flexure arms have a spatially-varying mixture of compressive and tensile strain. In this context, stress refers to a deforming force per unit area, whereas strain refers to the physical deformation (e.g., elongation) of an elastic element. The results show that the elastic components of the flexure include both compressive and tensile strain.

The membrane may have a curved profile, such as a convex profile (e.g., as viewed from the exterior of the fluid lens). The curvature of the membrane may be determined, for example, by one or more parameters such as the pressure of the enclosed lens fluid, the elastic properties of the membrane, and the position of each control point of the membrane. The radius of curvature of the curved profile may be adjusted, for example, by movement of one or more control points of the membrane. In some examples, an actuator may be configured to move a control point along a predetermined trajectory, thereby adjusting the curvature of the membrane profile, and correspondingly, the optical power of the fluid lens. A fluid lens may include one or more actuators. In some examples, each actuator may be mechanically coupled to the membrane attachment of a flexure.

Figure 10:
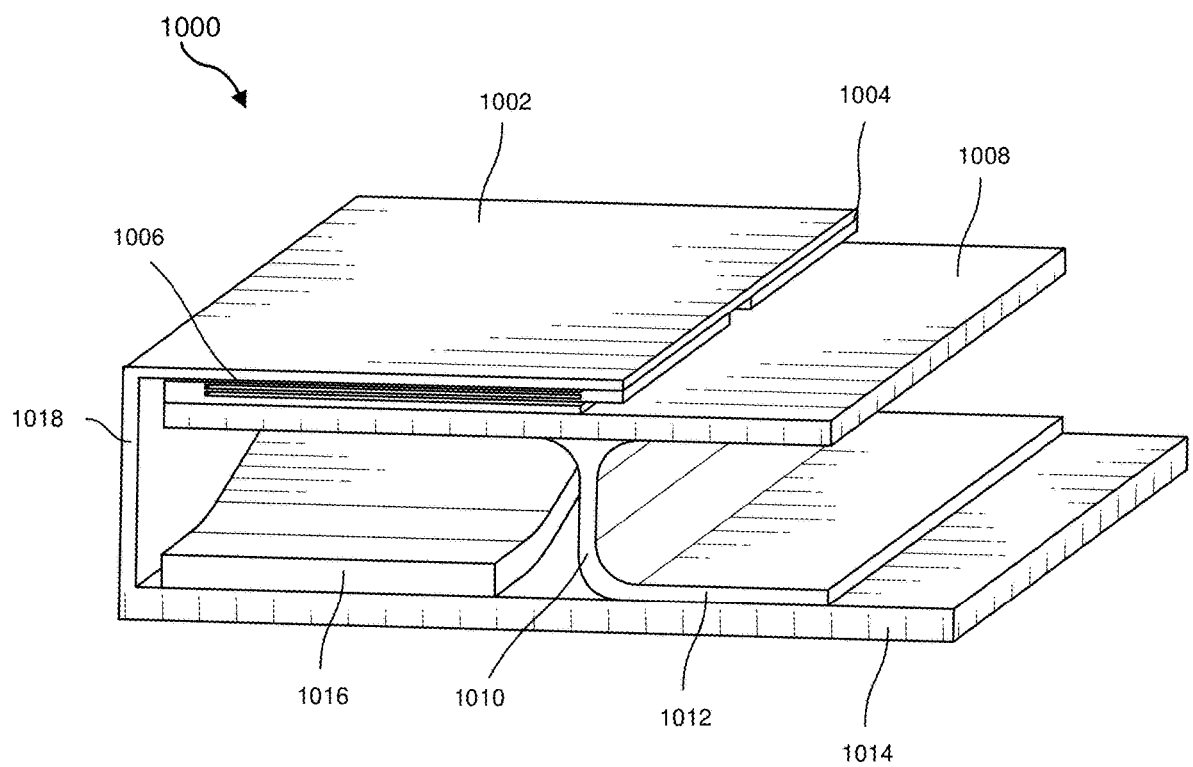
FIG. 10 shows an actuator supported by the substrate of a fluid lens, the substrate having a flexure-based connection to the membrane.

FIG. 10 shows a cross-section of a portion of a fluid lens, including an actuator. The fluid lens 1000 includes a rigid element 1002 having an end portion 1004, an elastic element 1006, a membrane 1008, an edge seal 1010, a substrate layer 1012, a substrate 1014, an actuator 1016, and a lens assembly edge portion 1018. In some examples, the membrane 1008, edge seal 1010, and substrate layer 1012 may be combined into a unitary structure that provides an enclosure (sometimes referred to as a bag) for a lens fluid, and may also have one or more control points. The membrane may be attached to a flexure at each control point, where the flexure may include a rigid element such as 1002, and an elastic element such as 1006. The rigid element may include a membrane attachment, where the rigid element is attached to the membrane at or proximate a control point. As illustrated, the elastic element may include a metal assembly. However, in some examples, the elastic element 1006 may include an elastomer, such as a polymer elastomer, and may have a larger vertical extent than shown in the figure. In some examples, the actuator 1016 may be a bender-beam actuator, and may be located below the elastic element 1006. The substrate 1014 may include a rigid transparent material, such as a transparent polymer or a glass. The membrane 1008 may include a polymer film, such as a flexible transparent elastomer, and may be under tension. The membrane may have a curved profile. The edge seal 1010 and substrate layer 1012 may include a similar material to the membrane 1008, and one or more of these elements may be combined into a unitary structure. Only representative portions of the membrane 1008, substrate 1014, and substrate layer 1012 are shown. These components, along with the edge seal 1010, may cooperatively form an enclosure for a lens fluid (not shown).

In some examples, the actuator may be supported by the substrate of the fluid lens, and may be configured to provide a force that is effective to move a control point of the membrane along a predetermined trajectory. This may, for example, include a component of movement that increases the distance between the control point and the substrate. A lens may include one or more actuators, and each actuator may be configured to move one or more control points along a respective predetermined trajectory. In some examples, an actuator, such as a bender-beam actuator, may be controllable to adjust the distance between a membrane control point and the substrate. For example, a bender-beam actuator may have an electrically-controlled degree of bending, and increased bending may increase the distance between the control point and the substrate. The change in distance between the control point and the substrate may change an elastic force on the membrane attachment exerted by the membrane, and may also change another elastic force exerted on the membrane attachment induced by deformation of the elastic element. In some examples, these elastic forces may counteract each other, reducing the energy needed to change the distance between the control point and the substrate.

In some examples, actuator signals (e.g., electrical signals provided to one or more actuators) may be provided by a control circuit. In some examples, a control circuit may provide one or more actuator signals, based on the desired optical power of the fluid lens. The position of the control points may be adjusted to modify the optical power of the lens.

Figure 11A:
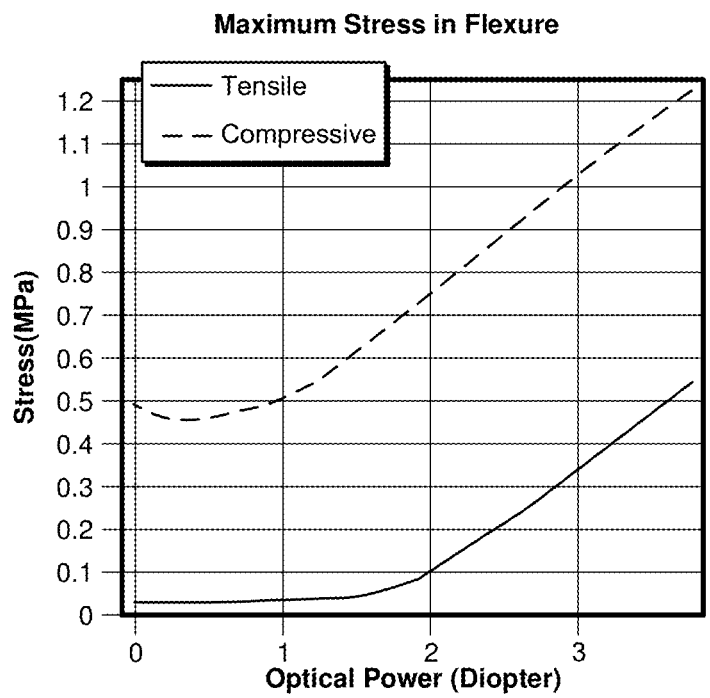
FIG. 11A shows the maximum stress in the flexure as a function of the optical power of an example lens.

FIG. 11A shows the maximum stress in the actuation-related deformation of an elastic element, such as flexure arm 310 (in MPa) for both tensile and compressive strain, as a function of the optical power of the fluid lens in diopters (D).

Figure 11B:
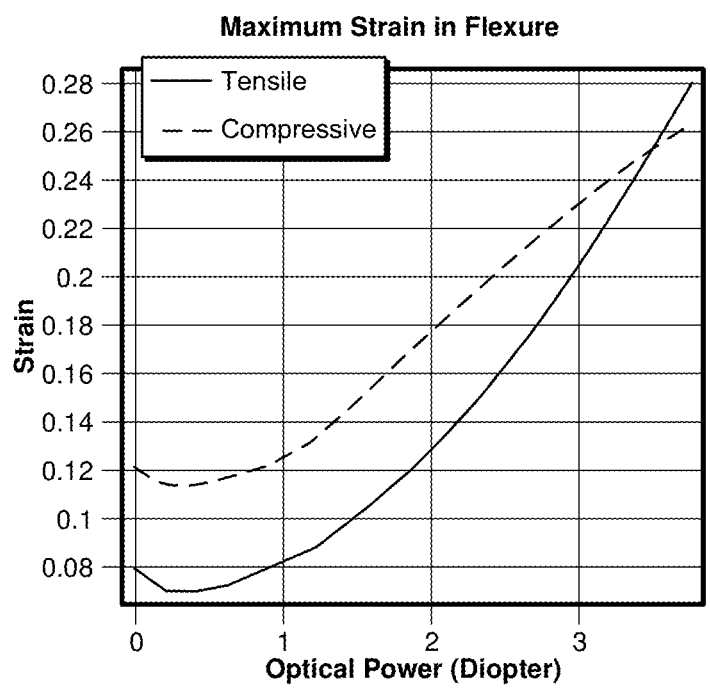
FIG. 11B shows the maximum strain in the flexure as a function of the optical power of an example lens.

FIG. 11B illustrates the maximum strain in an elastic element, such as the flexure arm 310, for both tensile and compressive stresses, as a function of the optical power of the fluid lens in diopters (D).

Figure 12:
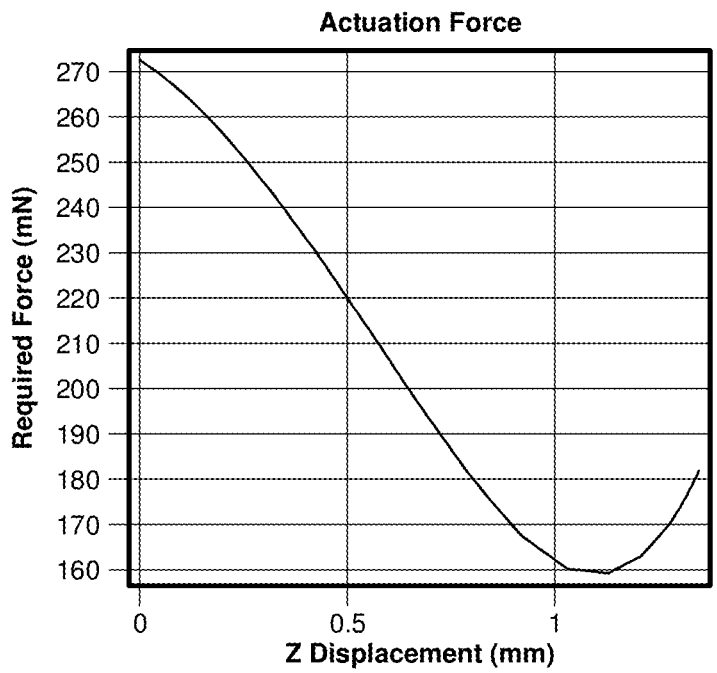
FIGS. 12 and 13 show the actuation force as a function of displacement, for example, of the rigid element of a flexure.

FIG. 12 shows the actuation force versus axial displacement in millimeters. The actuation forces are slightly less than one tenth of the membrane tension force for the modeled sector. This configuration represents a slight negative spring with a stiffness approximately −110 N/m, less than a typical piezoelectric bender. The figure shows that the displacement curve is multivalued for a given force, over a certain range of forces.

Figure 13:
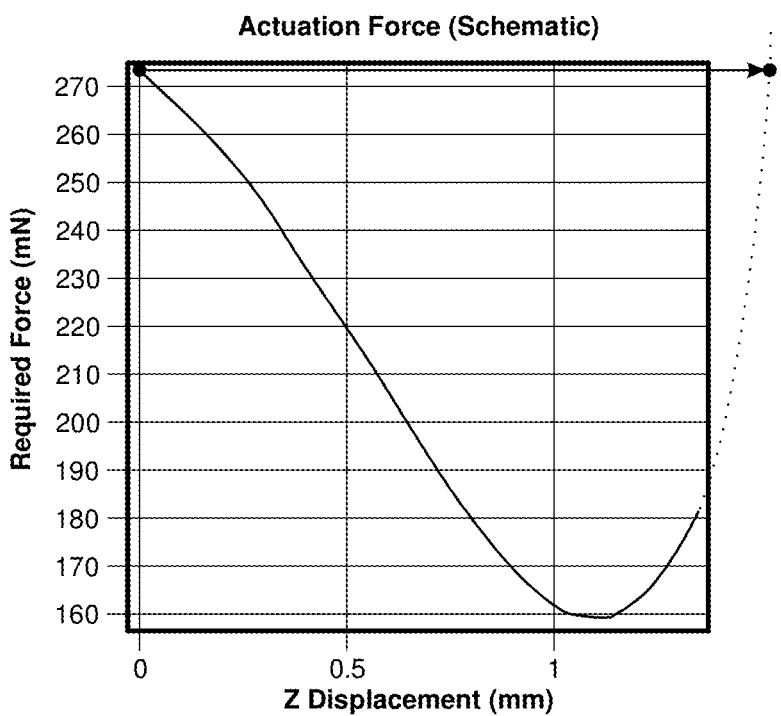

FIG. 13 shows an actuation force plot versus axial displacement, similar to that of FIG. 12. In this case, the figure includes an extrapolation (the dashed line outside of the axes) that suggests that the structure may be buckling over a portion of the operating range. The force versus displacement plot appears to have a region of negative stiffness, and if a constant downward force is applied to the device at zero displacement, the flexure arm may jump to a new configuration. However, this is a relatively mild buckling response. In a fluid lens application, the stiffness of an actuator (e.g., a piezoelectric actuator), or other associated lens component, may be sufficient to counter any buckling tendencies.

Figure 14:
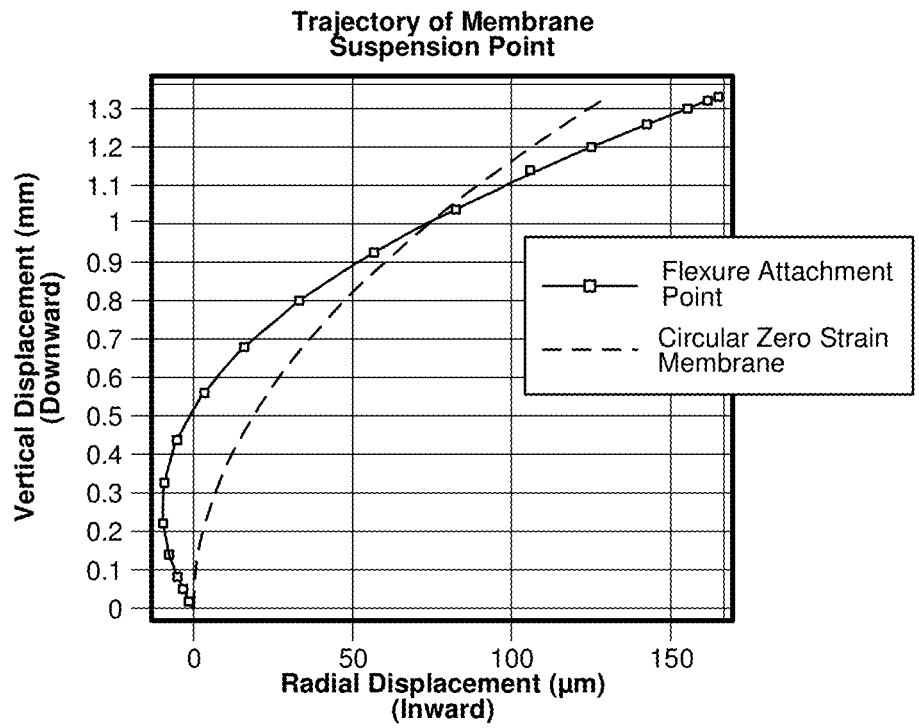
FIG. 14 shows an example trajectory of a membrane control point.

FIG. 14 shows the change in vertical displacement (in mm) as a function of radial displacement (in mm), and may represent the trajectory of a control point on actuation of the fluid lens. By changing the structure of the flexure, for example, the dimensions and angles of flexure components (e.g., as exemplified in FIGS. 3, 4A and 4B), the relationship between vertical and radial displacement may be controllably modified. Membrane trajectory is relatively close to the zero-strain membrane trajectory. In this example, the flexure arms are not long enough to produce a shallow trajectory, and offsetting the trajectory curve may reduce deviation from the zero-strain trajectory. A zero-strain trajectory may be desirable, as the elastic energy in the membrane may be unchanged through a zero-strain trajectory of the control point. The term "zero-strain" may, in some examples, refer to trajectories in which the trajectory is normal to the local elastic force exerted on the membrane attachment at the control point, and/or may be a trajectory that does not change the elastic energy stored in the membrane. For example, a trajectory that stays close to the zero-strain trajectory may reduce any decrease (or increase) in the membrane tension on actuation of the fluid lens.

In some examples, a device, such as a fluid lens, includes a membrane, a lens fluid, a substrate, and a flexure, where the membrane is in tension. The device may be configured so that displacing the edge of the membrane creates an approximately normal force to the plane of the membrane in the flexure, that at least partially counteracts the force exerted by the membrane.

Figure 15:
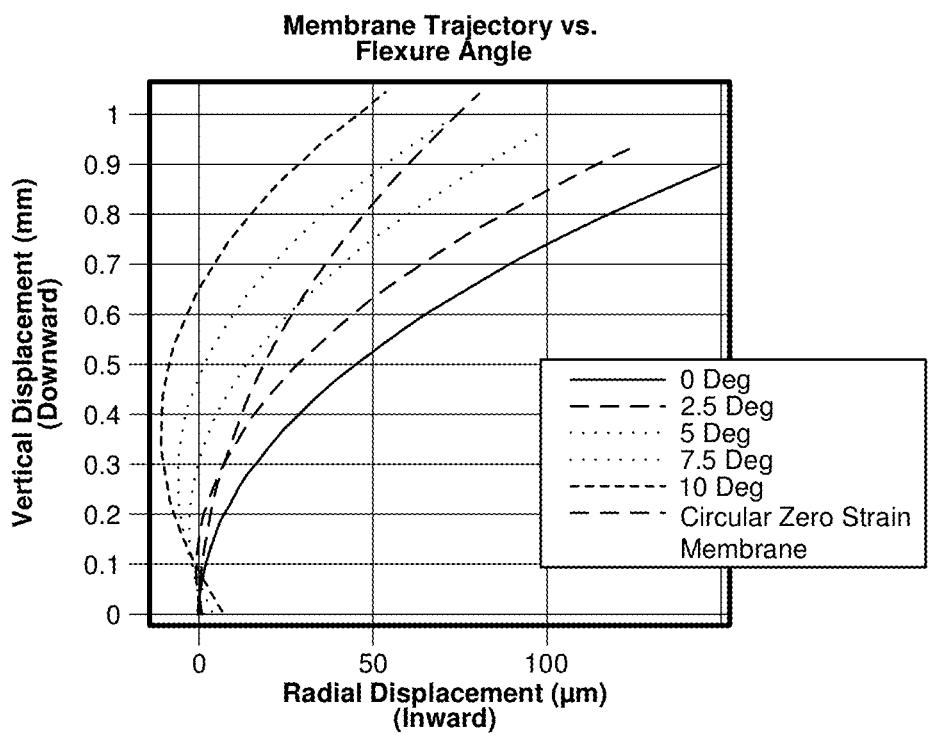
FIG. 15 illustrates adjustment of the trajectory of a membrane control point by varying the angle between a pair of elastic elements.

FIG. 15 shows the results of simulations in which the membrane was represented by a radial force, and shows the approximate effect of changing the lower flexure angle on the trajectory of a membrane control point. The flexure angle is discussed above in relation to FIG. 4B.

Figure 16:
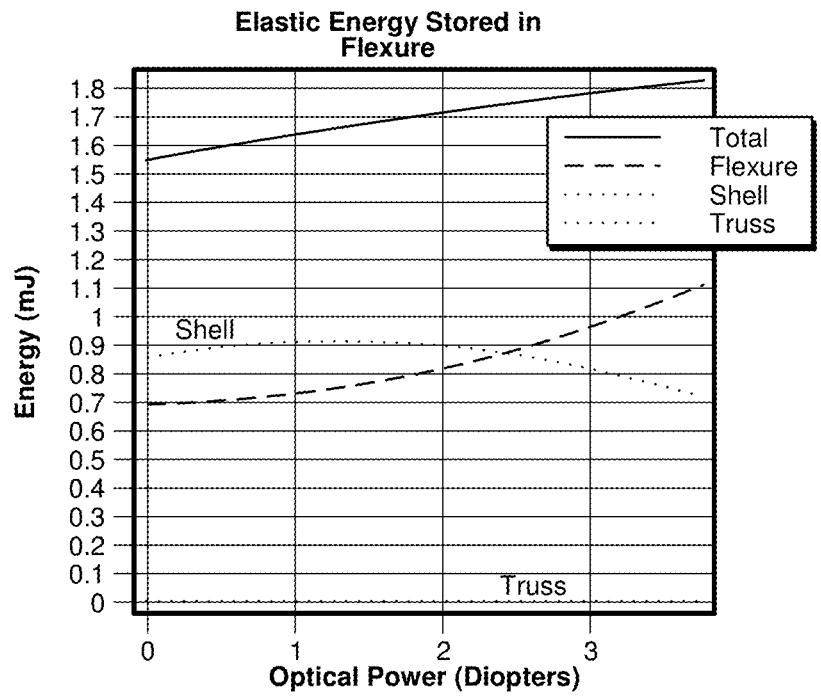
FIG. 16 shows the energy stored in the flexure and the membrane as a function of lens optical power.

FIG. 16 illustrates the changing balance of different components of elastic energy in the system, as the optical power of the fluid lens is adjusted. The figure shows elastic energy in the elastic elements of the flexure (e.g., the flexure arms), the membrane (modeled as an elastic shell), and the truss. In some examples, a truss may include a wire running around the edge of a membrane, that may be under stress. A truss may include an element, such as a wire, that interconnects two or more control points, and thereby may interconnect the elastic elements. The elastic energy stored in the truss may be approximately zero (on the illustrated scale) and may be neglected. Decreasing the gradient of the elastic energy increase corresponds to a slight, negative, spring effect. In some examples, an increase in the elastic energy of the flexure components may be compensated for by a decrease in the elastic energy stored in other lens components, such as the membrane, to reduce the required actuation force.

Figure 17:
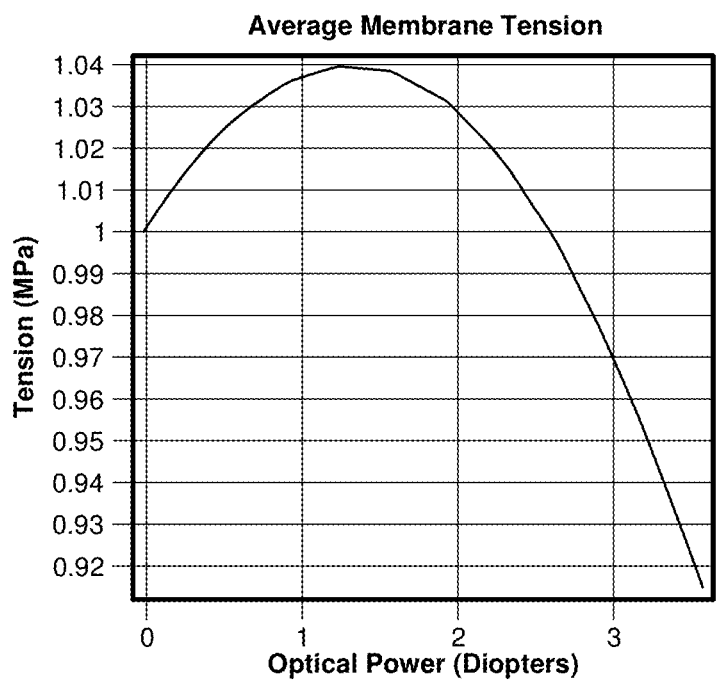
FIG. 17 shows average membrane tension as a function of lens optical power.
Figure 18A:
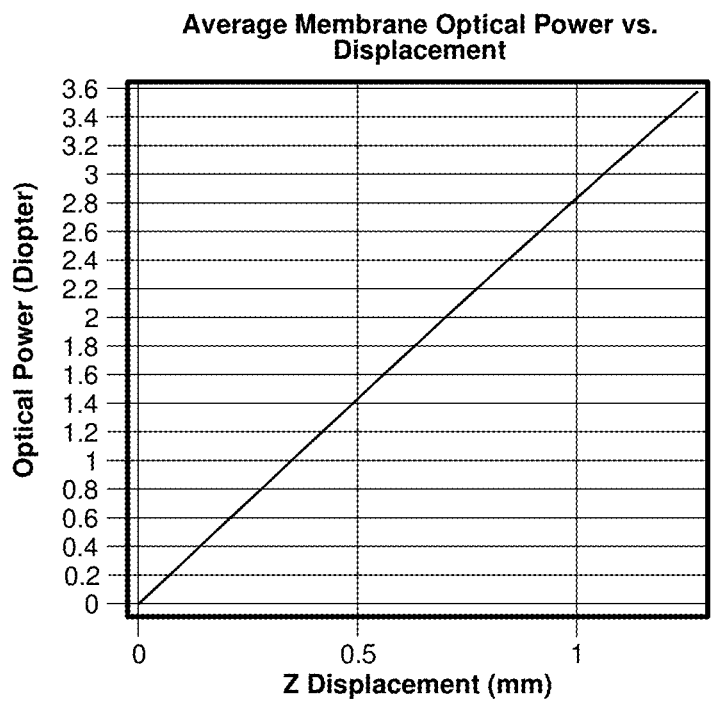
FIG. 18A shows average lens optical power as a function of control point displacement.
Figure 18B:
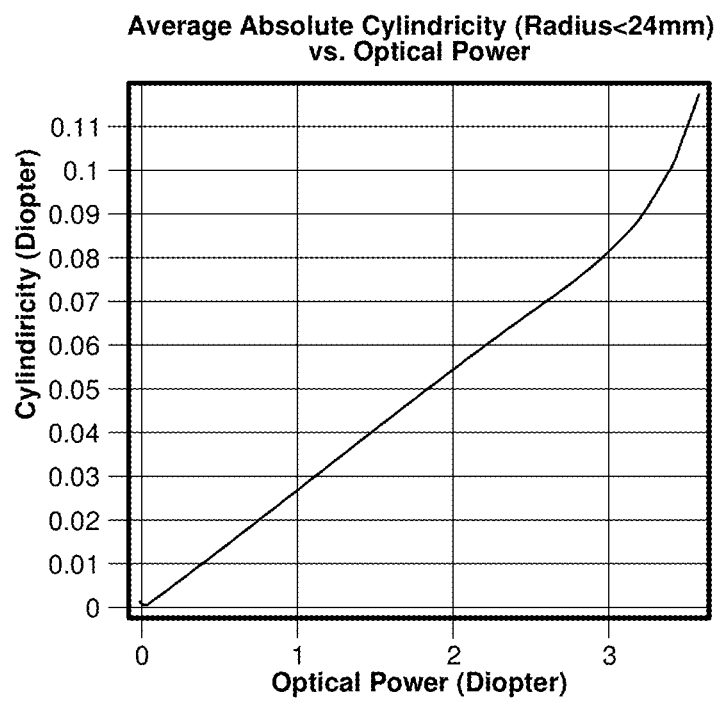
FIG. 18B shows average lens cylindricity as a function of optical power.

FIG. 17 shows that the membrane tension varies with the optical power of the lens (in diopters), and is reduced by 8% at a lens power of 3.5 diopters. This reduction is appreciable, but not unreasonable. The initial membrane tension in the initial (non-actuated) configuration may be increased to allow for this decrease in the membrane tension. In this example, the trajectory causes the membrane tension to first increase and then decrease.

FIG. 18A shows that the optical power is a generally linear function of displacement. The displacement is denoted z-displacement, which may be normal to the substrate (e.g., for a planar lens substrate), and parallel to the optic axis of a fluid lens.

FIG. 18B shows that cylindricity increases slightly, as expected, with higher optical power. However, the optical properties of the lens are good.

Figure 19:
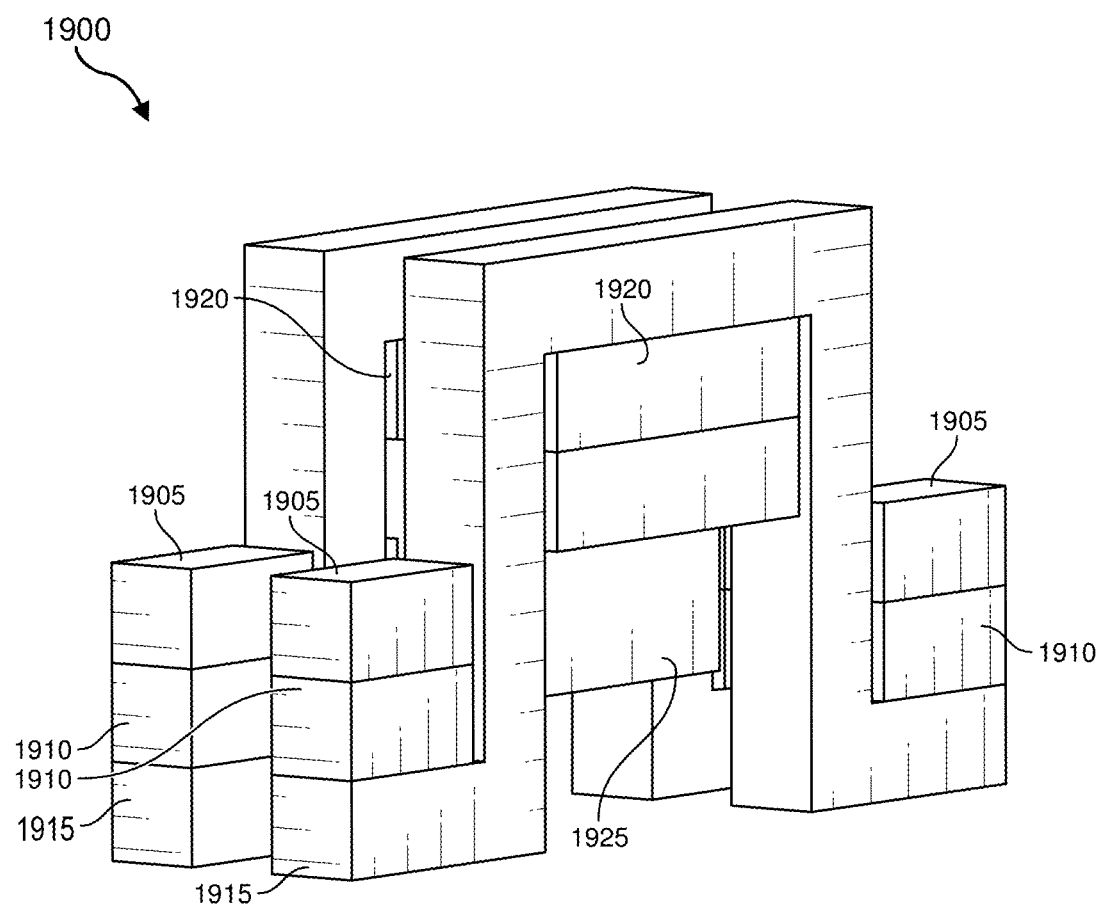
FIG. 19 illustrates a flexure configuration, in accordance with embodiments of this disclosure.

FIG. 19 shows an alternative configuration, including an example flexure 1900. The flexure 1900 includes four elastic elements labeled 1910, with one elastic element hidden in this view. The flexure support 1905 may be rigid, and may be attached to, for example, the lens substrate, and may also be referred to as a fixed structure. A flexure support 1905 is attached to one end of each elastic element 1910. The other end of each elastic element 1910 is connected to the rigid element 1915, which may also be termed a transfer structure. There are two spaced-apart rigid elements 1915. A membrane (not shown) may be attached to a membrane attachment 1925. In this example, the membrane attachment is attached to a second elastic element 1920, and the second elastic element 1920 is also attached to the rigid elements 1915.

Figure 20:
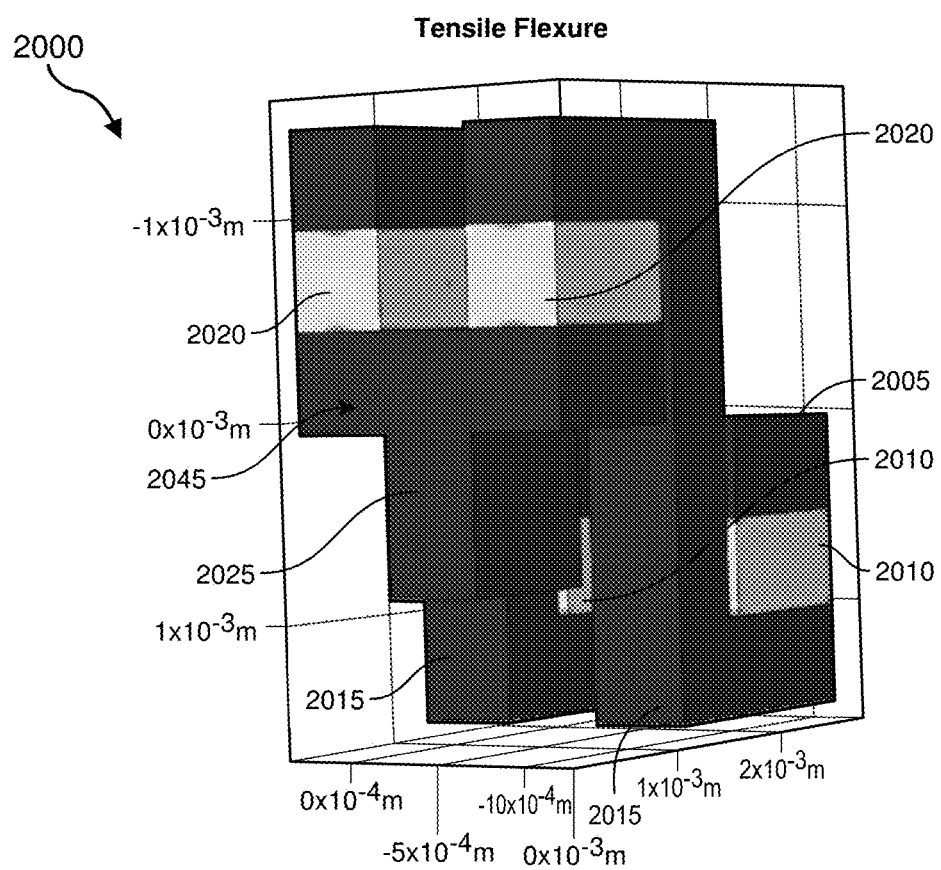
FIG. 20 shows a half-symmetry model of an example flexure configuration, in accordance with embodiments of this disclosure.

FIG. 20 shows a half-symmetry model of an example flexure, which may be similar to that described above in relation to FIG. 19. The flexure 2000 includes elastic elements 2010, a flexure support 2005, a pair of rigid elements 2015, and a membrane (not shown) may be attached to the membrane attachment 2025. The membrane attachment 2025 is attached to one end of each of a pair of second elastic elements 2020, and the other end of the second elastic elements 2020 are attached to a corresponding rigid element 2015. FIG. 20 shows the flexure without any applied stress or displacement. The elastic elements (2010, 2020) are shown in light gray, and rigid components are shown in a darker shading. There may be a symmetry plane, which may be approximated by a vertical plane through the point labeled 2045. The shading within the elastic elements qualitatively illustrates the location of stresses.

Figure 21:
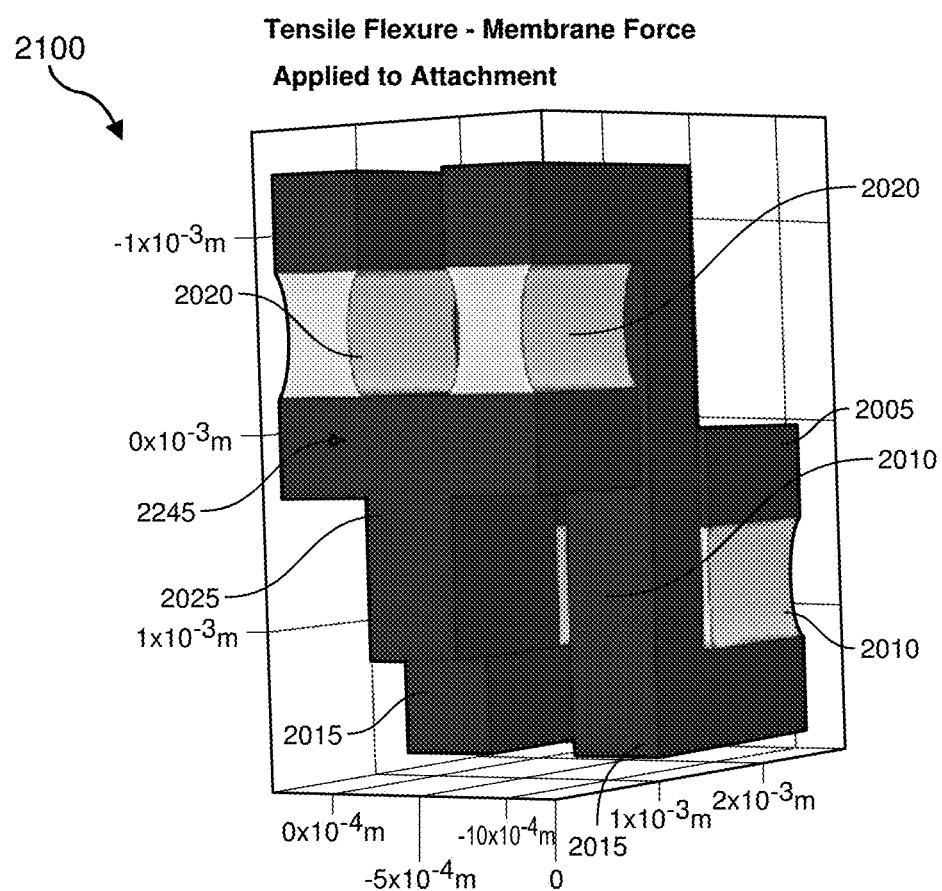
FIG. 21 shows a half-symmetry model of an example flexure configuration, subject to a radial membrane force.

FIG. 21 shows a half-symmetry model of an example flexure, which may be similar to the flexure described above in relation to FIGS. 19 and 20, with a 1 N downward force applied to the membrane attachment 2025. The applied force induces deformation in the elastic elements 2020 (corresponding to the elastic elements 1920 of FIG. 19) and 2010 (corresponding to the elastic elements 1910 in FIG. 19). The shading qualitatively illustrates the location of stress within the elastic elements.

Figure 22:
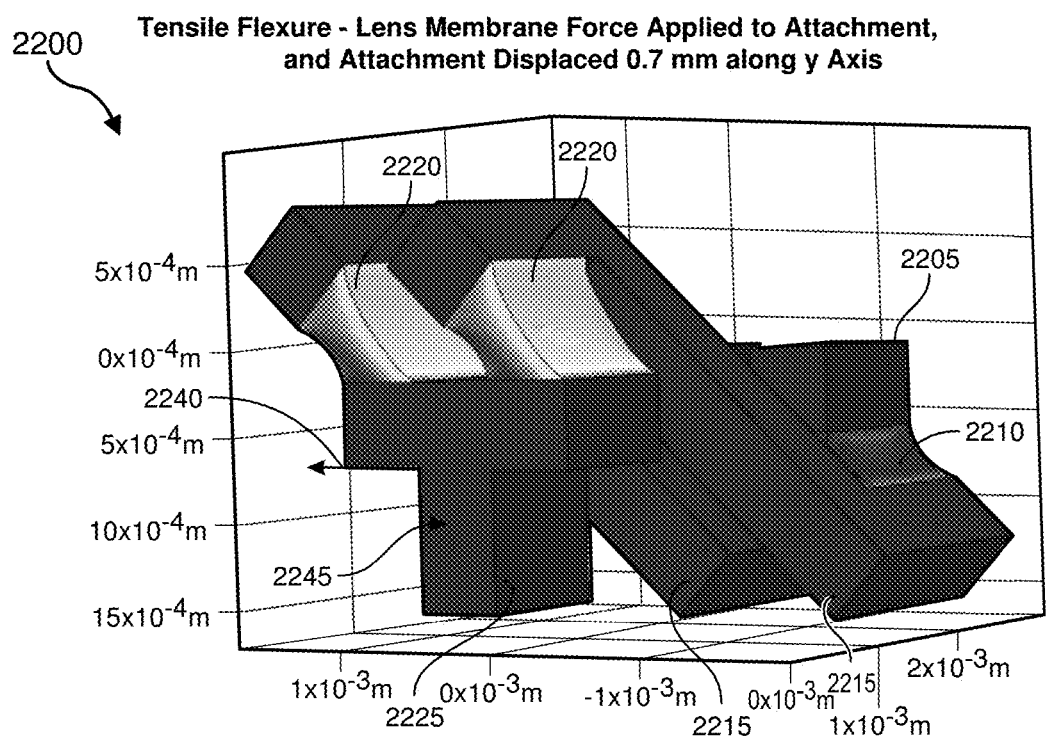
FIG. 22 shows a half-symmetry model of a flexure configuration, subject to a radial membrane force and a vertical actuation displacement.

FIG. 22 shows the half-symmetry model of an example flexure, which may be similar to the flexure described above in relation to FIGS. 19-21. The flexure 2200 is shown with a 0.7 mm actuation displacement in the negative Y direction, as indicated at 2240. The flexure 2200, here illustrated as a tensile flexure, includes elastic elements 2210 and 2220, a membrane attachment 2225, a rigid element (which may also be referred to as a transfer structure) 2215, and a flexure support (acting as a fixed structure) 2205. A symmetry plane passes approximately through the indicated point 2245. The elastic elements 2210 interconnect the rigid element 2215 and the flexure support 2205, which may be (or include) a fixed structure attached to the lens substrate (not shown). The shading within the elastic elements qualitatively illustrates the location of stresses.

Figure 23:
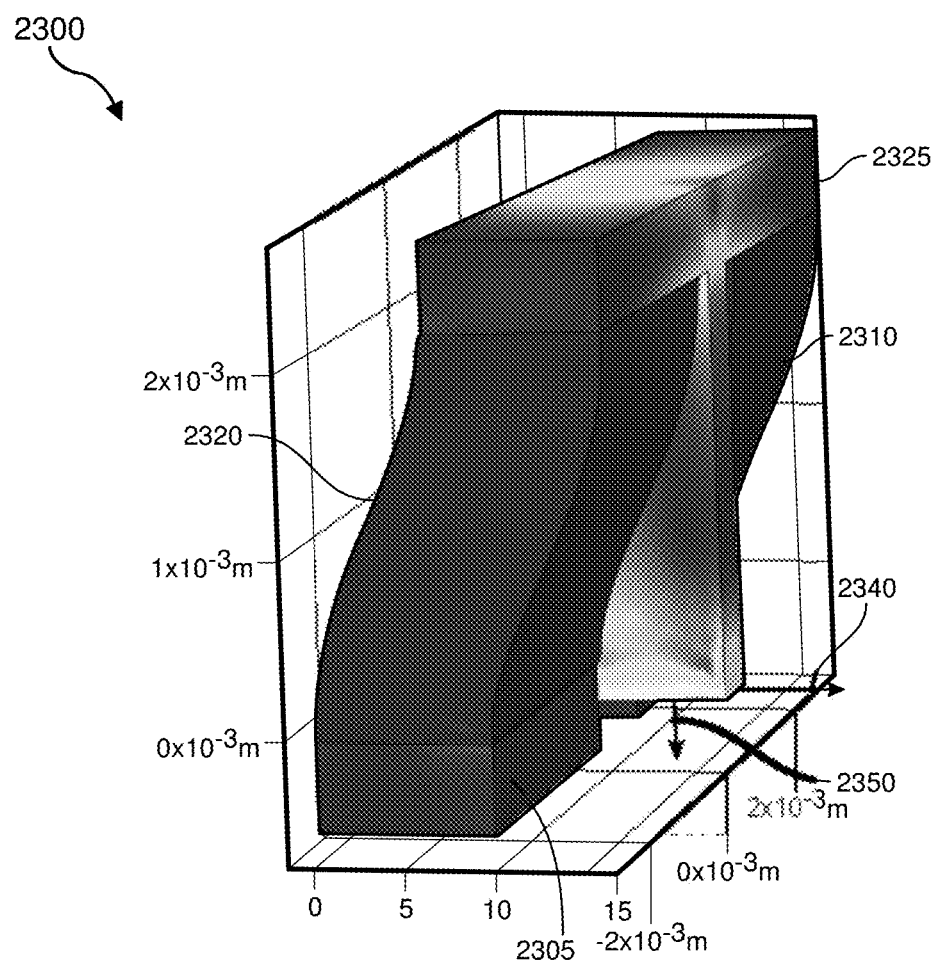
FIG. 23 shows a compressive flexure having an elastic connection between the rigid element and the membrane attachment, in accordance with embodiments of this disclosure, subject to a radial membrane force.

FIG. 23 shows an example flexure 2300, which may be a compressive flexure. The flexure 2300 includes elastic elements 2310 and 2320, and a rigid element 2325 that includes the membrane attachment. The membrane attachment may be provided by the lower portion of the rigid element, and attached to the membrane at a control point. In this example, the rigid element has a generally T-shaped form. The elastic elements 2310 and 2320 interconnect the rigid element 2325 and the flexure supports 2305, which may be (or include) one or more fixed structures attached to the lens substrate (not shown). The figure shows one of the flexure supports 2305, and in this view the other flexure support is mostly hidden behind the rigid element 2325. The membrane force direction is shown by the arrow 2350, and the displacement direction (here along the denoted Y-axis) is shown by arrow 2340. The shading within the elastic elements qualitatively illustrates the location of stresses.

The rigid element 2325, that in this example provides the membrane attachment, may include one or more materials, such as one or more rigid materials, such as a polymer (e.g., polycarbonate, polyetheretherketone, an epoxy polymer, nylon, or other polymer), a metal (e.g., aluminum, titanium, iron, nickel, copper, zirconium, alloys thereof, steel, or other metal or alloy), or a composite (e.g., a fiber-polymer composite, such as carbon fiber in epoxy resin, a particle-polymer composite, a multilayer, or other composite). Other fluid lens components (such as a rigid element, rigid arm, flexure support, substrate, or other fluid lens component) may include, for example, one or more similar materials. Example rigid materials also include glass, ceramic, inorganic materials (such as oxides, nitrides, carbides, and the like), or other rigid materials.

Figure 24:
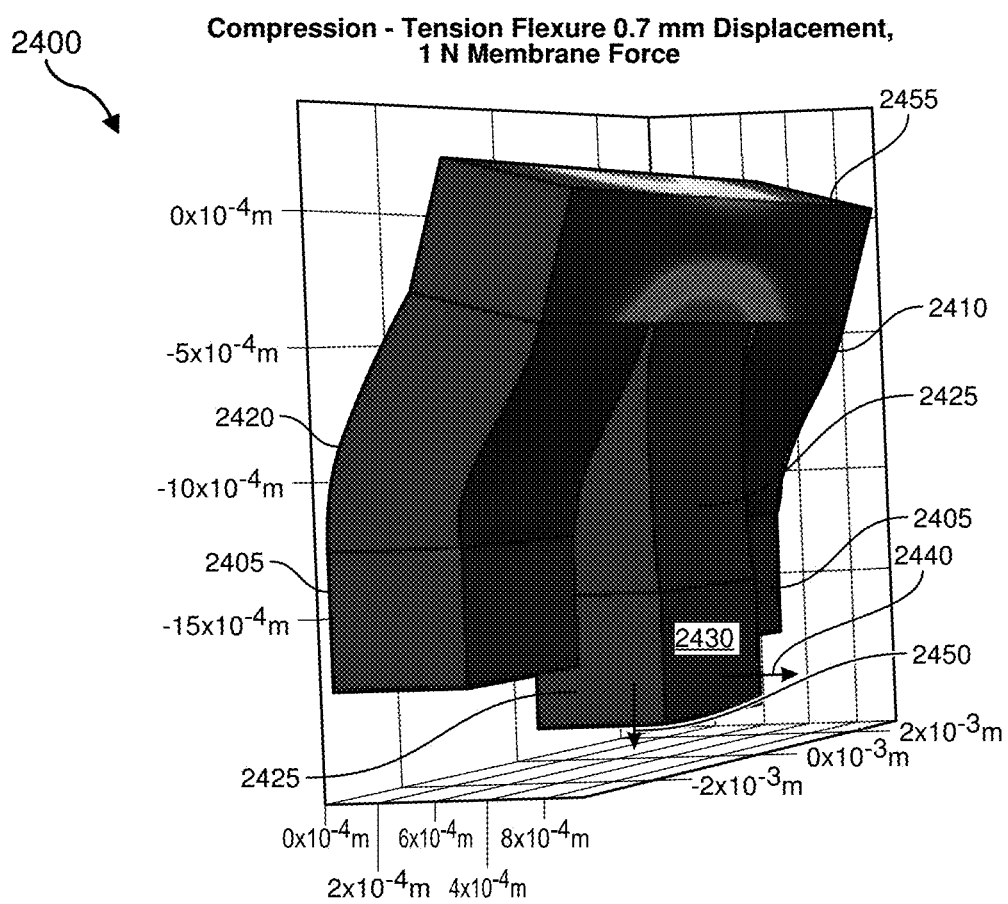
FIG. 24 shows a compressive flexure having an elastic connection between the rigid element and the membrane attachment, in accordance with embodiments of this disclosure, subject to a radial membrane force and a vertical actuation displacement.

FIG. 24 shows an example flexure 2400, which may be considered as a variation of the compression flexure 2300. The flexure 2400 is attached to the substrate (not shown) using flexure support (a fixed structure) 2405, and includes elastic elements 2410 and 2420. The elastic elements 2410 and 2420 interconnect the flexure support 2405 and a bridge element 2455. The bridge element is connected to the membrane attachment 2430 by attachment connector 2425. The membrane may be attached to the membrane attachment 2430. The shading within the elastic elements qualitatively illustrates the location of stresses.

In this example, a compression-tension flexure is formed by replacing a rigid element including the membrane attachment (e.g., replacing the rigid element 2325 in the configuration described in relation to FIG. 23) with the combination of a rigid bridge element 2455, a flexible (e.g., elastic) attachment connector 2425, and a rigid membrane attachment 2430. Replacing a portion of the rigid element with an elastic component reduces the flexure stress in the elastic elements 2410 and 2420 (relative to 2310 and 2320 in FIG. 23), and may also modify the force on the membrane (not shown) as a function of the displacement. The force exerted by the membrane is downwards (as illustrated, and indicated by the arrow at 2450.) The displacement of the control point is horizontal (as illustrated, and indicated by the arrow at 2440).

In some examples, at least a portion of the rigid arm of a rigid element (e.g., as discussed above) may be replaced by a flexible connection. For example, a generally T-shaped rigid element may be replaced by a rigid bridge element (e.g., corresponding to the horizontal top portion of the T-shape), an elastic attachment connector (e.g., which may replace a portion of the central vertical portion of the T-shape), and a rigid membrane attachment (e.g., corresponding to the bottom portion of the central vertical portion of the T-shape).

Figure 25A:
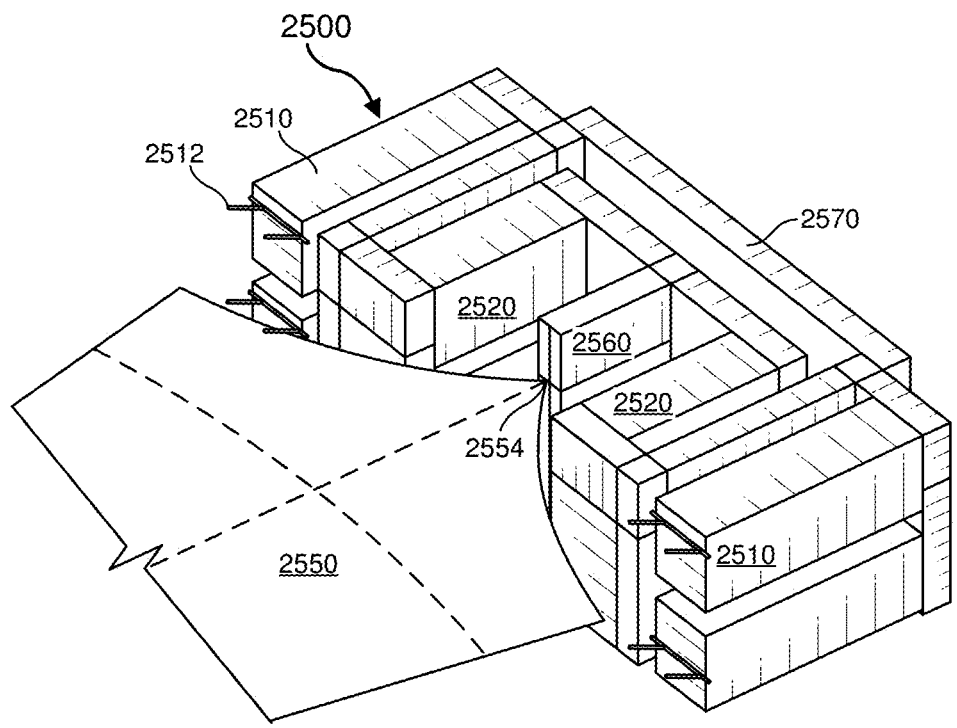
FIGS. 25A-25B show a flexure configuration, in accordance with embodiments of this disclosure, and the deformation of the membrane and flexure due to actuation for an example fluid lens.

FIG. 25A shows another embodiment of a flexure. The flexure 2500 includes elastic elements 2510 and 2520. The elastic elements 2510 connect the first rigid element 2570 (which may also be referred to as a base) to the flexure support (not shown, but the connection to the flexure support is provided by connector 2512). The elastic elements 2520 connect the first rigid element 2570 to a second rigid element 2560 that provides the membrane attachment. The membrane 2550 is attached to the second rigid element 2560 at the control point 2554. Only a portion of the membrane is shown in this figure. Radial and circumferential directions are shown within the membrane 2550 as dashed lines. The radial direction extends from the center of the lens (not shown) through the control point 2554, where the membrane 2550 is attached to the rigid element 2560.

Figure 25B:
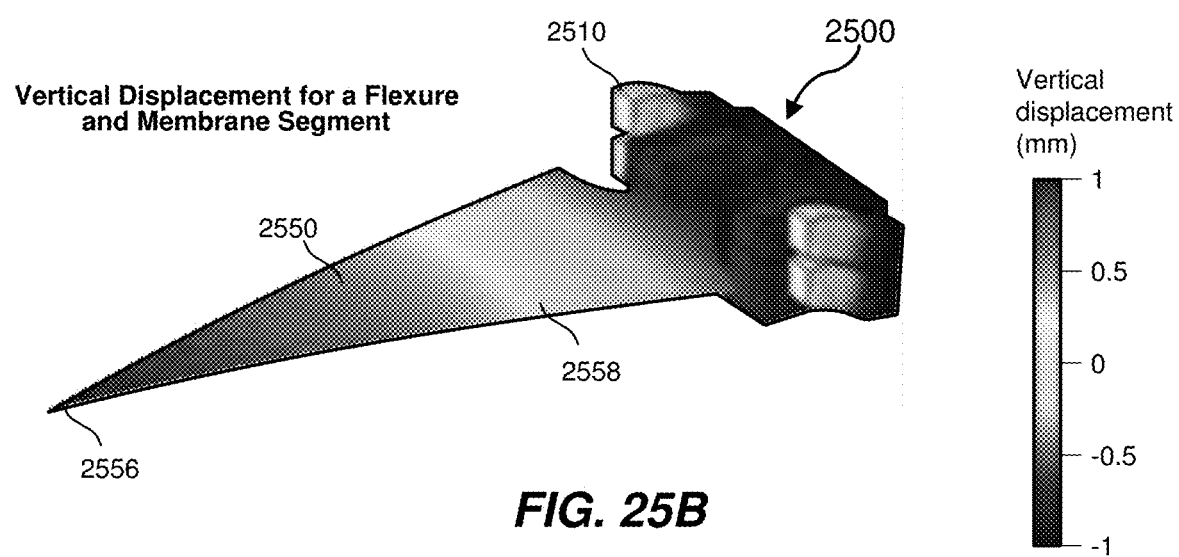

FIG. 25B shows the performance of the flexure 2500 with a fluid lens, showing a portion of membrane 2550 attached to the flexure 2500. The discussion of the displacement results may be better understood in relation to FIGS. 25A-B taken together. The shading of the flexure and the membrane is based on the displacement in the actuated state, relative to the original position. The rigid element 2560 is displaced in the negative direction (downwards as illustrated) by 1 mm. This displacement may be achieved using an actuator (not shown). The elastic elements 2510 have a variable displacement. There is essentially no displacement of the elastic element where it is connected to the flexure support. However, the other end of each elastic element is displaced by almost 1 mm downwards, where the elastic element connects to the rigid element. The membrane is displaced approximately 1 mm downwards within a peripheral region, for example, proximate the control point. The membrane has an approximately arcuate portion 2558 in which the membrane displacement is approximately zero. The membrane has a central portion 2556, inside the arcuate portion 2558, in which the membrane displacement is positive, upwards as illustrated. The displacement at the lens center, within central portion 2556, is approximately +1 mm.

The design shown in FIG. 25A was used to evaluate the impact of creep on the flexure performance. The elastic elements included a soft nitrile rubber, offering both creep resistance and low bending stiffness. The flexure configuration included two, four band flexures arranged in parallel either side of the membrane attachment point, as discussed above in relation to FIG. 25A. The flexure extended 3.5 mm beyond the scalloped periphery of the membrane. The example design included a generally circular membrane with the following characteristics; a circular membrane segment of outer radius 27.2 mm, 16 control points actuated over 1.25 mm, the membrane pretensioned with 1 MPa, and including the effect of the fluid pressure.

The flexure design of FIG. 25A met various design targets. The membrane load is carried axially along the flexures. The flexures allow for bending over a 1.25 mm range with forces less than 0.36 N. Further, the flexures are readily manufacturable.

The example guidance system appeared to be reasonably tolerant of creep strains of order 1-3%, with the following effects observed. The membrane tension was reduced by a small amount (2%) as a result of the creep. There was an 8-11 µm radial deviation in the actuator trajectory. There was an up to a 50 mN reduction in the actuation force, with a new zero force position at 0.25 mm of vertical displacement. However, the optics were largely unaffected by the creep.

The flexure is assumed to be held at a constant vertical displacement for a long time (sufficient to creep of order a percent or so), and it is also loaded laterally by the membrane. The constant displacement boundary condition may be achieved, for example, by a piezoelectric actuator with displacement feedback. This is a mixture of force loading and fixed displacement.

Figure 26:
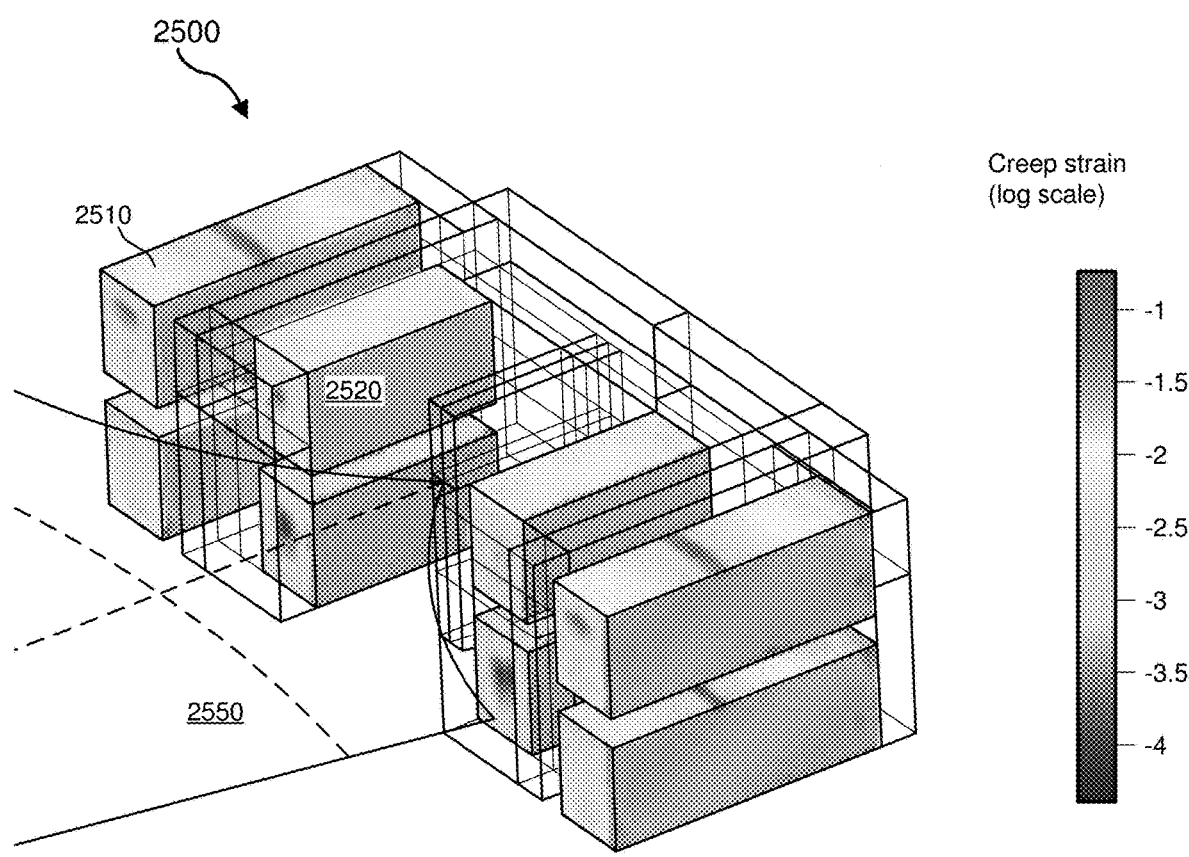
FIG. 26 shows effective creep strain in an example flexure.

FIG. 26 shows the approximate effective creep strain on a log scale at the final time for creep. The scale bar is logarithmic, with the number being a power of 10, (e.g., −2 corresponds to 0.01). The line outline represents the flexure of FIG. 25. Only the elastic elements (e.g., 2510 and 2520) are shown shaded, as creep is not an issue for other components of the flexure.

Figure 27:
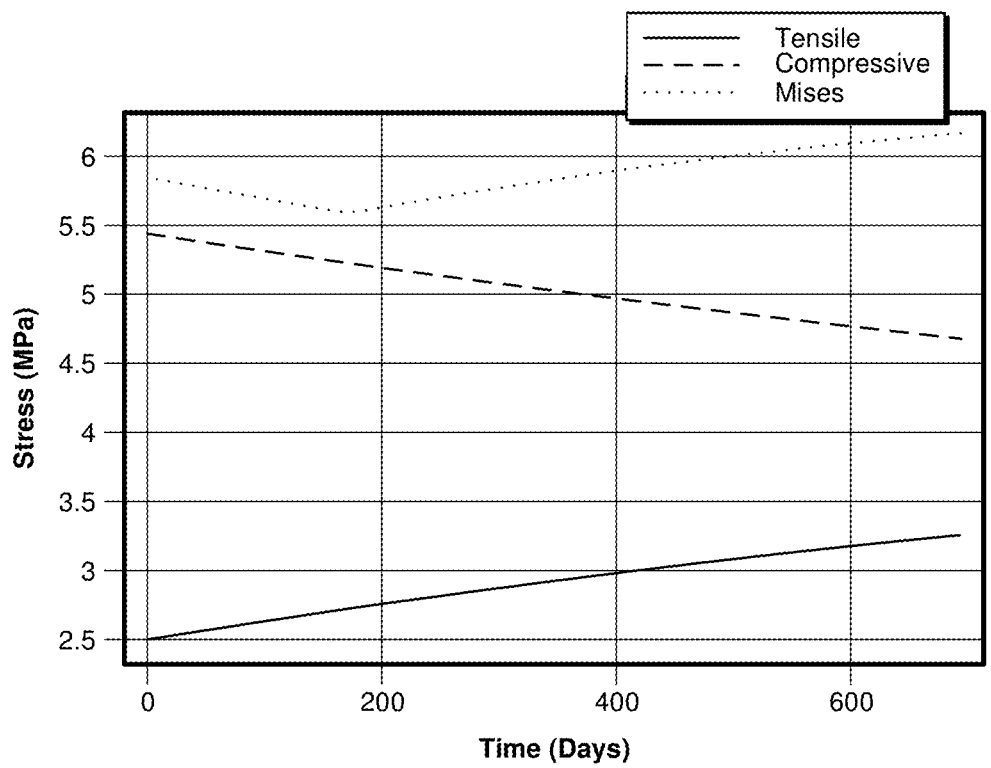
FIG. 27 shows example membrane stress variations due to creep over a period of days.

FIG. 27 shows that the maximum compressive and tensile principal stresses, as well as the maximum mises stress in the material, varied as a function of time. The time scales may vary with component materials, and the illustrated data is based on representative material properties.

Figure 28:
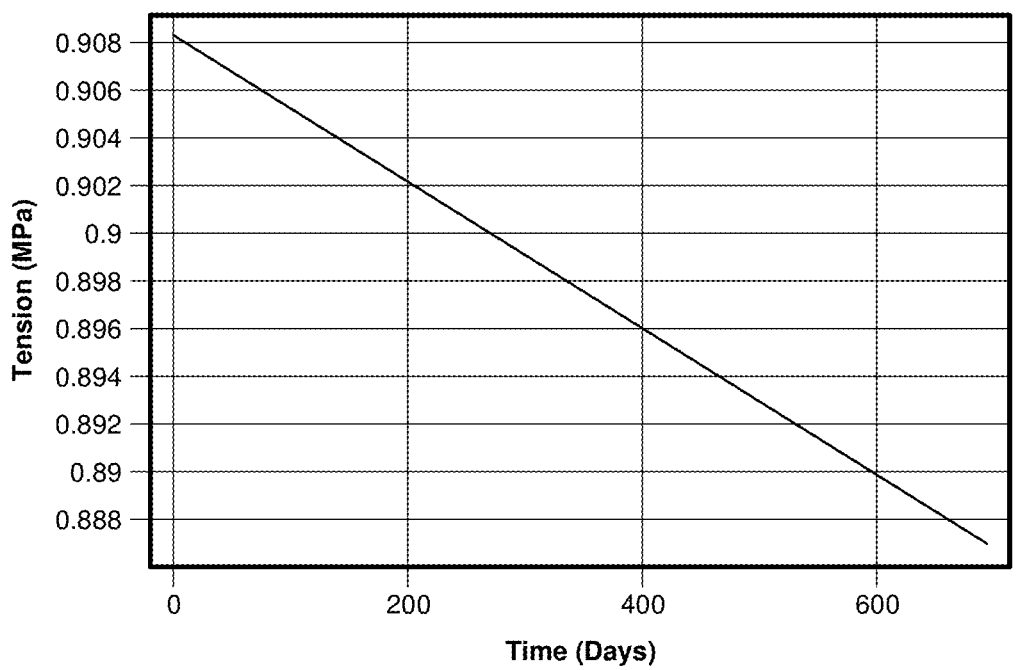
FIG. 28 shows example membrane tension variations due to creep over a period of days.

FIG. 28 shows that the membrane tension (average stress in the membrane, which is assumed not to creep) relaxes as a result of the creep in the flexure. The time scale is in days.

Figure 29:
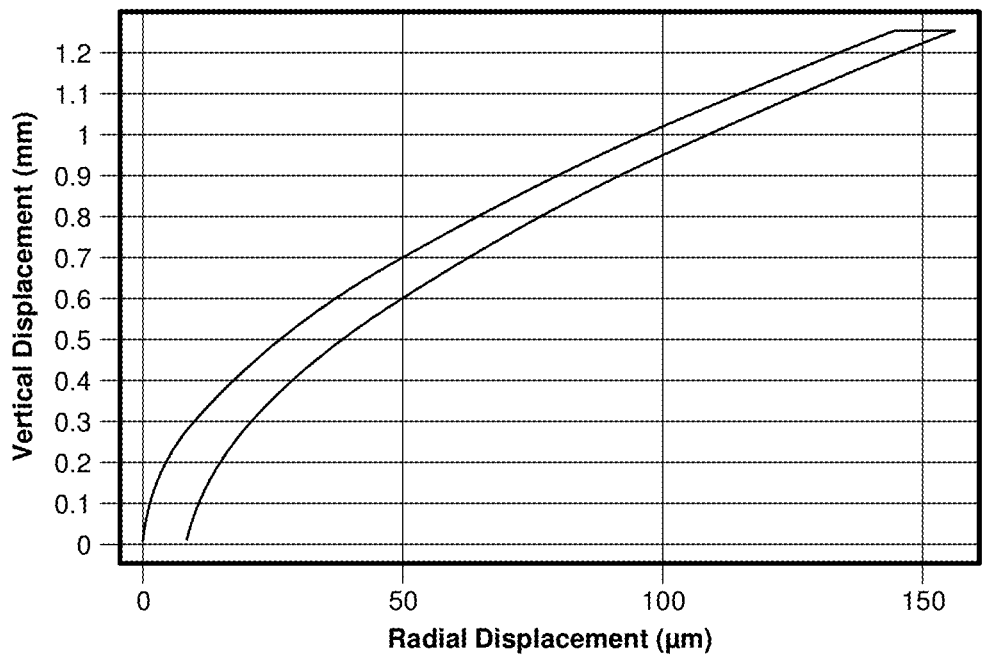
FIG. 29 shows example stability of the radial displacement under creep.

FIG. 29 shows that the final radial displacement is 8 microns away from the initial position, and illustrates the effect on the force-displacement curve.

Figure 30:
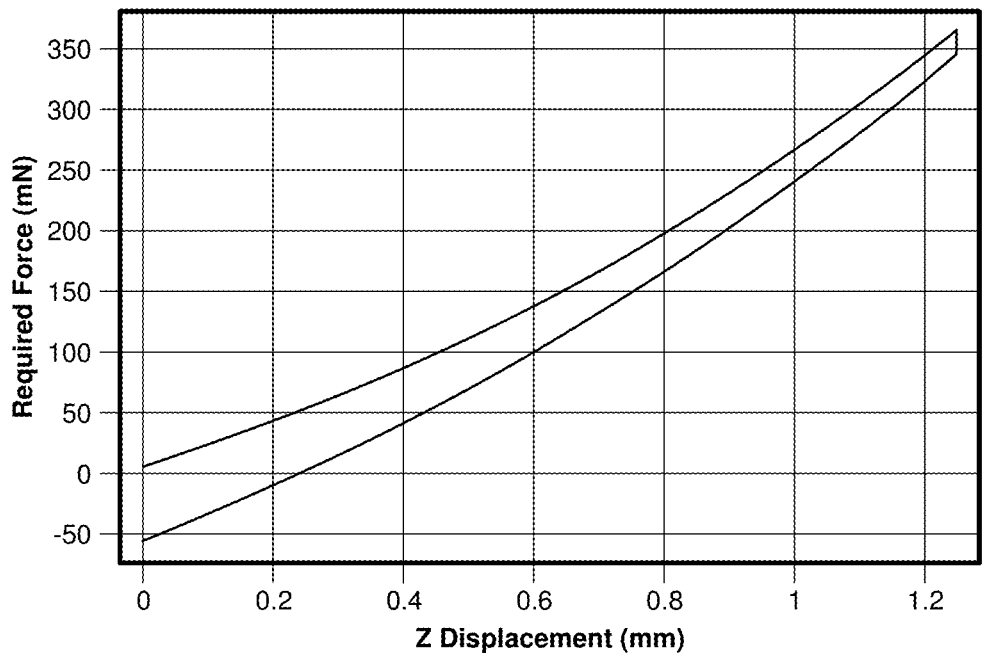
FIG. 30 shows example stability of the force-displacement curve under creep.

FIG. 30 shows that the zero force vertical displacement is 0.25 mm, and that 50 mN of reverse force is required to return the flexure to its original position.

FIG. 31 depicts a cross-section through a fluid lens, according to some embodiments. The fluid lens 3100 illustrated in this example includes a substrate 3102 (which in this example is a generally rigid, planar, substrate), a membrane 3150, a fluid 3108 (denoted by dashed horizontal lines), an edge seal 3185, and a flexure support 3190 providing a rigid support to the flexure shown generally at 3104. A pair of similar flexures 3104 are shown on opposite sides of the substrate. In this example, the flexure 3104 includes an elastic element 3110, and a rigid element 3140 including the rigid arm 3160 that provides the membrane attachment. The rigid arm provides a control point for the membrane where the membrane is attached to the rigid arm at 3154. In this example, the substrate 3102 has a lower (as illustrated) outer surface, and an interior surface which may optionally support a substrate coating. In this example, the interior surface of the substrate may be in contact with the fluid 3108. The membrane 3150 has an upper (as illustrated) outer surface and an interior surface enclosing the fluid 3108. The dashed line indicates the center of the fluid lens and the optic axis of the lens.

The fluid 3108 is enclosed within a cavity (e.g., an enclosed fluid volume) at least in part defined by the substrate 3102, the membrane 3150, and the edge seal 3185, which may cooperatively help define the cavity in which the fluid is located. The edge seal 3185 may extend around the periphery of the cavity, and retain (in cooperation with the substrate and the membrane) the fluid within the enclosed fluid volume.

In this example, the membrane 3150 has a curved profile, so that the lens fluid has a greater thickness (e.g., a distance measured along the lens optical axis) in the center of the lens, compared to the periphery of the lens (e.g., proximate the edge seal 3185). In some examples, the fluid lens may be a plano-convex lens, with the planar surface being provided by the substrate 3102, and the convex surface being provided by the membrane 3150. A plano-convex lens may have a thicker layer of lens fluid near the center of the lens. However, other configurations are possible, such as a plano-concave lens configuration in which the membrane curves in towards the substrate near the center of the lens. The substrate may also have a curved surface that provides optical power to the fluid lens.

The fluid lens may have a plurality of flexures arranged around the periphery (or within a peripheral region) of the substrate 3102. The flexures may attach the membrane to the substrate, optionally through a flexure support.

The lens 3100 may include one or more actuators (not shown in FIG. 31), which may be located around the periphery of the lens, and may be part of or mechanically coupled to the flexures 3104. The actuators may exert a controllable force on the membrane through one or more control points, such as control point 3154, which may be used to adjust the curvature of the membrane surface and hence one or more optical properties of the lens (e.g., focal length, astigmatism correction, cylindricity, and the like). For example, an actuator may be mechanically coupled to the rigid element 3140. In some examples, the control point may be attached to an peripheral portion of the membrane, and may be used to control the curvature of the membrane.

In some examples, FIG. 31 may represent a cross-section through a circular lens, though examples may also include non-circular lenses. In various examples, a fluid lens, such as discussed in relation to FIG. 31, may include one or more of any appropriate flexure structure, such as any of the example flexures discussed herein.

In some examples, a device, such as a device including a fluid lens (such as a liquid lens), includes a transparent elastic membrane, where the membrane is in tension, and where the tension is restrained by a flexure that includes a first elastic member, where at least a portion of the elastic member is in compression. A device may include a first elastic member and a second elastic member, where the first and second elastic members are proximate to each other. Each elastic member may have a first and second approximately opposed face, where the first face is attached to a first surface, and the second face is attached to a structure connected to at least a portion of the transparent elastic membrane. In some examples, the first and the second elastic members may be parallel to each other, and in some examples, the first and the second elastic members are at an angle to each other, where the angle may be between 0 (parallel) and 15 degrees, such as between 1 and 15 degrees of each other, such as between 1 and 10 degrees, for example, between 3 and 10 degrees. An elastic member may include one or more materials selected from natural rubbers, synthetic rubbers (e.g., nitrile rubber, or silicone rubber), or other elastomers. In some examples, a flexure includes a first and a second elastic member, where each elastic member has a first and a second face, where the first face is connected to a first surface, and the second face is connected to a second surface. The first and a second elastic members may be proximate to each other. In some examples, each elastic member may have a first and a second approximately opposed face, where the first face is attached to a first surface, and the second face is attached to a common structure, to which a force may be applied in at least one direction. The elastic member may be an elastomer.

FIG. 32 illustrates an example method, for example, a method of controlling a fluid lens, such as a method of adjusting one or more optical properties of fluid lens (e.g., optical power, cylindricity, astigmatism correction, and the like). The method 3200 includes providing a fluid lens including a membrane connected to a substrate using a flexure, the flexure including an elastic element and a rigid element (3210), applying a force to the rigid element (3220, e.g., using an actuator), and deforming the elastic element to adjust the fluid lens (3230, e.g., by modifying the profile of the membrane).

FIG. 33 illustrates an example method 3300, for example, a method of controlling a fluid lens, such as a method of adjusting one or more optical properties of fluid lens (e.g., optical power, cylindricity, astigmatism correction, and the like). The method includes applying a force (e.g., a force provided by an actuator) to a rigid element within a flexure of a fluid lens (3310), displacing the rigid element (e.g., relative to the substrate of the fluid lens) by deforming an elastic component of the flexure (3320), and thereby modifying the curvature of a membrane of the fluid lens attached to the flexure (3330), thereby modifying, for example, the optical power of the lens.

In some example, one or more flexures may be used to control the profile of a membrane, such as an elastic membrane used in a fluid lens. In some examples, the membrane may be a component of a fluid lens, and one or more flexures may be used to adjust the profile of the membrane, for example, to adjust the optical power of the lens. In some examples, the membrane may be a component of a mirror, and one or more flexures may be used to adjust the optical power (or other optical property) of a mirror. For example, a membrane may be metalized, include a multilayer, or may otherwise be reflective at one or more operational wavelengths. In some examples, a device includes a fluid lens, which may include a substrate, a membrane, and a fluid located within a cavity, wherein the cavity is at least partially defined by the substrate and the membrane. The fluid lens may include one or more flexures interconnecting the membrane and the substrate. An example flexure may include a membrane attachment and an elastic element, wherein the membrane attachment is connected to the membrane. The connection of the membrane attachment to the membrane may provide a control point of the membrane. The device may be configured so that a displacement of the membrane attachment adjusts a profile of the membrane, and the displacement of the membrane attachment induces a deformation of the elastic element. For example, the control point may move along a trajectory as the membrane attachment is displaced. In some examples, a displacement of the membrane attachment (e.g., from a non-actuated position) induces a compression of at least a portion of the elastic element, and in some examples may induce both a compression (e.g., a compressive stress) and an extension (e.g., a tensile strain) within different portions of the elastic element. In some examples, the fluid lens has an optical power, and the optical power of the fluid lens is adjustable by adjusting the profile of the membrane.

In some examples, the elastic element includes one or more elastomers, such as a rubber material, such as a natural or a synthetic rubber. An example flexure includes one or more elastic elements, and each elastic element may include one or more elastomers. For example, an elastic element may include a synthetic rubber, such as a nitrile rubber.

In some examples, a device includes an actuator configured to induce the displacement of the membrane attachment. An actuator may be supported by the substrate, and may be, for example, rigidly attached to the substrate.

In some examples, a device may include a flexure support attached to the elastic element, wherein the flexure support rigidly attaches the flexure to the substrate. For example, the flexure support may provide a rigid support for the flexure. In some examples, the flexure support is configured to support a surface of an elastic element. Another surface of the elastic element, such as an opposite surface, may be attached to a rigid element. A flexure support, or a separate support, may be used to support an actuator configured to displace at least a portion of the rigid element.

In some examples, a flexure includes at least one pair of elastic elements. For example, a pair of elastic elements may include a spaced apart and generally parallel elastic elements. In some examples, a rigid element may extend between two or more pairs of elastic elements. For example, a rigid element may be attached to two spaced apart pairs of elastic elements, and provide or be connected to the membrane attachment.

In some examples, a rigid element may include the membrane attachment, for example, as a rigid arm. In some examples, the membrane attachment may be connected to the rigid element, for example, through a flexible connection, for example, by an elastic connector. In some examples, a rigid element may not show appreciable deformation under the forces used to adjust the membrane profile, and a rigid element may have a stiffness (e.g., as measured by an elastic constant for deformation) that may be two or more orders of magnitude greater than that of an analogous elastic constant for an elastic component. In some examples, a rigid element may include one or more of a metal, a polymer (such as a generally rigid polymer), a composite material (such as a composite of a polymer and particles and/or fibers), a glass, a ceramic, or other generally rigid material.

In some examples, one or more elastic elements are rigidly attached to the substrate (e.g., the substrate of a fluid lens or other optical element) and provide a flexible connection between the substrate and a rigid element. The rigid element may be attached to the membrane by a membrane attachment. For example, the membrane may be adhered, welded, clipped, or otherwise attached to the membrane attachment at a control point.

In some examples, a device may further include a frame configured to support one or more fluid lenses. The device may be, or include, an eyewear device, such as eyeglasses, goggles, a visor, or the like. The device may be an augmented reality device and/or a virtual reality device.

The membrane may be a component of a device, such as an optical device, such as a head-mounted device such as eyeglasses, a visor, or other headset (such as an augmented reality headset or virtual reality headset). A device may be configured to display an image, for example, to an eye of a user. In some examples, a device may be configured to display an image on a screen or other surface (e.g., a wall).

In some examples, a method includes providing a fluid lens having a membrane connected to a substrate using a flexure, where the flexure including an elastic element and a rigid element, applying a force to the rigid element, and deforming the elastic element to adjust the fluid lens, where deforming the elastic element includes compressing at least a portion of the elastic element. In some examples, deforming the elastic element includes compressing a first portion of the elastic element, and extending a second portion of the elastic element. Applying a force to the rigid element may include displacing the rigid element using an actuator. Deforming the elastic element to adjust the fluid lens may include modification of the membrane profile, and may allow adjustment of the optical power of a fluid lens.

In some examples, a device including a fluid lens may be (or include) an eyewear device (e.g., spectacles, goggles, eye protectors, visors, and the like), and may include a pair of fluid lenses. A device may include a frame, and the frame may include components configured to support the eyewear device on the head of a user, for example, on the nose and/or ears of the user.

In some examples, a device may include an augmented or virtual reality device, which may include a waveguide display and one or more adjustable lenses in front of each eye. The adjustable lenses may be adjusted for one or more of the following purposes: providing improved focus for the eyes, distance or close viewing, or for correcting VAC, as discussed above. One or more of the adjustable lenses may be a fluid filled lens. Example applications may include thin, light and low power devices. Device design may include reduction or minimization of thickness, weight, and/or response time.

In some examples, a fluid lens may have a planar-planar configuration, which in some examples may be adjusted to a plano-concave and/or plano-convex lens configuration.

In some examples, a coating may be deposited on the interior surface of the seal portion and/or edge seal, for example, to help seal the cavity, improve appearance, for some or other reason. In some examples, the lens fluid may be enclosed in a flexible enclosure (sometimes referred to as a bag), which may include an edge seal, a membrane, and a central seal portion. In some examples, the central seal portion may be adhered to a rigid substrate component, and may be considered as part of the substrate.

A device configuration may be adjusted, for example, by adjustment of forces on the membrane using actuators, and the device may be configured in a planar-convex fluid lens configuration as shown, the where the membrane tends to extend away from the substrate in a central portion.

In some examples, the lens may also be configured in a planar-concave configuration, in which the membrane tends to curve inwardly towards the substrate in a central portion. In some examples, a membrane may include a peripheral structure (e.g., an eye wire) that, in some examples, may be stiff in the plane of the membrane to resist the line tension of the membrane, and may be compliant for out-of-plane bending. A fluid lens may be actuated by moving the peripheral structure towards or away from the substrate (e.g., using an actuator to move the location of one or more control points), thus compressing/expanding the envelope and changing the optical power of the lens. A peripheral support may include a tensioned wire, held between two control points, and attached along at least part of its length to the membrane. In some examples, a peripheral support, such as a wire under tension, may extend around the periphery of the membrane.

In some examples, an eyewear device includes one or more fluid lenses, such as a pair of fluid lenses, each fluid lens being associated with a respective eye of a user. An example eyewear device includes at least one fluid lens supported by eyeglass frames. In some examples, an eyewear device may include an eyeglass frame, goggles, visor, or other frame structure to support one or more fluid lenses, such as a pair of fluid lenses. In some examples, a fluid lens may be sized for ophthalmic, augmented reality, or virtual reality applications, and may have a diameter (or analogous dimension for a non-circular lens, e.g., a top to bottom height), in the range 10 mm-100 mm, such as between 20 mm-80 mm.

Example eyewear devices may include a pair of fluid lenses, according to some embodiments. Example eyewear device may include a pair of fluid lenses supported by a lens support, which may include an eyeglass frame, a visor, or other head-mounted device. The pair of fluid lenses may be referred to as right and left lenses, respectively (from the viewpoint of the user). A lens support, such as a frame, may be sized to mount on a typical human head, such as the head of a user.

In some examples, the frame may include one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers).

In some examples, an eyewear device may include a pair of eyeglasses, a pair of smart glasses, an augmented reality device, a virtual reality headset, or the like. An eyewear device may include one or more of; batteries or other power supplies, other refractive lenses including additional fluid lenses, diffractive elements, displays, eye-tracking components and systems, motion tracking devices, gyroscopes, computers, health monitoring devices, cameras, and audio recording and/or playing devices such as microphones and speakers.

A fluid lens may include a peripheral support, such as a support ring or eye wire. A peripheral support may include a support ring affixed to the perimeter of a membrane, such as a distensible membrane, in a fluid lens. The peripheral support may have the same shape as the lens periphery. In some examples, non-round fluid lens may include a peripheral support that may bend normally to a plane, for example, a plane corresponding to the membrane periphery for a round lens.

A fluid lens may include a membrane, such as a distensible membrane. A membrane may include a thin sheet or film (having a thickness less than its width or height). The membrane may provide the deformable optical surface of an adjustable fluid lens. The membrane may be under a line tension, which may be the surface tension of the membrane. Membrane tension may be expressed in units of N/m.

In some examples, a coating may include a liquid or other fluid, such as a gel or mucus, that may be immiscible in the lens fluid and that preferentially adheres to an interior surface enclosing the cavity.

In some examples, one or more lens components (such as a substrate, edge seal, or membrane) may be imparted with a coating (e.g., using a similar method to those described herein) before assembly of the fluid lens.

In some examples, the interior surface enclosing the cavity may be further processed to reduce or increase the number of nucleation sites. For example, the membrane or substrate may be locally heated to assist in providing a smooth surface. In some examples, particles or other nucleation structures may be deposited on an interior surface enclosing the cavity.

In some examples, a device may include a membrane, a support structure (such as a flexure) configured to provide a guide trajectory for a peripheral portion of the membrane (such as a control point), a substrate, and an edge seal. In some examples, the support structure may be attached to the substrate. In some examples, a support structure including one or more elastomeric elements may be termed a flexure. For example, a flexure may be attached to the substrate using a flexure support, which may be rigid.

In some examples, an adjustable fluid-filled lens includes a membrane assembly. A membrane assembly may include a membrane (e.g., having a line tension), and a wire or other structure extending around the membrane (e.g., a peripheral guide wire). In some examples, the membrane line tension may be supported by a support ring. This may be augmented by a static restraint at one or more location on the support ring boundary.

In some examples, a fluid lens includes a membrane, a support structure (such as a flexure) configured to provide a guide trajectory for an edge portion of the membrane, and a substrate. The fluid lens may further include a substrate, and an edge seal. In some examples, fluid lenses may include lenses having one or more elastomer or otherwise deformable elements (such as a membrane, and/or elastic elements of a flexure), a substrate, and a fluid. In some examples, movement of an peripheral portion of the membrane, such as a control point, along a guide trajectory may be used to adjust the optical properties of a fluid lens.

In some examples, a fluid lens, such as an adjustable fluid-filled lens, includes a membrane, such as a pre-strained flexible membrane, which at least partially encloses a fluid volume, a fluid enclosed within the fluid volume, a flexible edge seal which defines a periphery of the fluid volume, and an actuation system configured to control the periphery of the membrane, such that the optical power of the lens can be modified. The fluid volume may be a fluid-filled cavity.

Controlling the periphery of the membrane, for example, controlling the location of one or more control points, may require energy to deform the membrane, and/or energy to deform the membrane peripheral structure (e.g., in the case of non-round lenses). In some examples, a fluid lens configuration may be configured to reduce the energy required to change the power of the lens to an arbitrarily low value.

In some examples, an adjustable focus fluid lens includes a substrate and an membrane (e.g., an elastic membrane), where a lens fluid is retained between the membrane and the substrate. The membrane may be under tension, and a mechanical system for applying or retaining the tension in the membrane at sections may be provided along the membrane periphery or at portions thereof, for example, using one or more flexures, and/or one or more actuators. The mechanical system may allow the position of the sections to be controllably changed in both height and radial distance. In this context, height may refer to a distance from the substrate, along a direction normal to the local substrate surface, or along the optical axis of the lens. Radial distance may refer to a distance from a center of the lens, in some examples, a distance from the optical axis along a direction normal to the optical axis. In some examples, changing the height of at least one of the sections restraining the membrane may cause a change in the membrane's curvature, and the radial distance of the control point may be changed to reduce any increase in the membrane tension. In some examples, a mechanical system may include one or more actuators, and the one or more actuators may be configured to control both (or either of) the height and/or radial distance of one or more of the control points.

An adjustable focus fluid lens may include a substrate, a membrane that is in tension, a fluid, and a peripheral support helping to restrain the membrane tension, where the peripheral support forms an effective circumference of the membrane, and where the effective circumference can be controlled. Controlling the circumference of the membrane may controllably maintain the membrane tension when the optical power of the fluid lens is changed.

Changing the optical power of the lens from a first power to a second power may cause a first change in membrane tension if the membrane circumference is not allowed to change. However, changing the membrane circumference may change the membrane tension by zero or at least +/−1%, 2%, 3%, or 5%. The +/− aspect may include positions where a load offset or a negative spring force may be applied to the actuator.

One or more components of a fluid lens may have strain energy within some or all operational configurations. In some examples, a fluid lens may include an elastomeric membrane that may have strain energy if it is stretched. Work done by an external force, such as force provided by an actuator when adjusting the membrane, may lead to an increase in the strain energy stored within the membrane. In some examples, one or more peripheral portions of the membrane are adjusted along a guide trajectory such that the strain energy stored within the membrane is not appreciably changed, or changed by a reduced amount.

A force, such as a force provided by an actuator, may perform work when there is a displacement of the point of application in the direction of the force. In some examples, a fluid lens is configured so that there is no appreciable elastic force in the direction of the guide trajectory. In such configurations, a displacement of the peripheral portion of the membrane (such as one or more control points) along the guide trajectory does not require work in relation to the elastic force. There may, however, be work required to overcome friction and other relatively minor effects.

In some examples, a fluid lens includes a peripheral support, such as a support ring. A peripheral support, such as a support ring, may include a member affixed to a perimeter of a distensible membrane in a fluid-filled lens. The peripheral support, such as a support ring, may be approximately the same shape as the lens. For a circular lens, the support ring may be generally circular. For non-circular lenses, the peripheral support may bend normally to the plane defined by the membrane for spherical optics. However, a rigid peripheral support ring may impose restrictions on the positional adjustment of control points, and in some examples a wire may be positioned around the periphery of the membrane as a peripheral support.

As detailed above, a fluid lens may include a membrane. A membrane may include a thin polymer film, having a thickness much less than the lens radius, or other lateral extent of the lens. The membrane may provide the deformable optical surface of an adjustable fluid-filled lens. A fluid lens may also include a substrate. The substrate may provide one face of an adaptable fluid-filled lens, opposite the surface provided by the membrane, and may include a rigid layer or a rigid lens. In some examples, one or more actuators may be used to control the line tension of a distensible membrane (units N/m). In some examples, a fluid lens may include an edge seal, for example, a deformable component configured to retain the fluid in the lens. The edge seal may connect an peripheral portion of the membrane to proximate portion of the substrate, and may include a thin flexible polymer film.

In some examples, a membrane may include one or more control points, which may also be referred to as connection points, actuation points, or attachment points. These may include locations within an peripheral portion of a membrane which may be moved, for example, using an actuator to move the control point along a guide trajectory to adjust the optical properties of the fluid lens.

Work done by forces, such as external forces, in causing deformation may be stored in a membrane or other lens component in the form of strain energy. A force may be considered to do work if there is a displacement of the point of application of the force in the direction of the force. The optical power of a lens may be a measure of the strength of a lens, for example, defined as equal to the reciprocal of the focal length in meters, and measured in diopters (D). For example, a 1D lens may have a focal length of 1 m, a 2D lens may have a focal length of 50 cm, and so on. Actuation forces may be applied to one or more control points. A control point may be a point on the periphery of a tensioned optical membrane, where the distance between the point and a substrate may be controlled. An actuation point may be a control point where the distance between the actuation point and the substrate may be adjusted, for example, by an actuator or some other mechanism. In a fluid filled lens the optical power is typically changed by moving one or more actuation points, thereby changing the shape of the membrane. A hinge point may be a static control point, typically allowing some rotation or twist of the membrane boundary while, in some examples, maintaining fixed distance from the point to the substrate. A substrate may include a rigid lens or transparent plate forming one wall of a fluid enclosure in a fluid-filled lens, typically opposite the distensible membrane. Line tension may be determined as the tensile force per unit length of a distensible membrane, units N/m. A membrane may include a thin sheet or film (e.g., of thickness much less than width or height) that forms a deformable optical surface in an adjustable fluid-filled lens. The term sequence may refer to an arrangement of optical elements, such as distensible membranes, hard lenses, diffractive elements, waveguide displays, or other optical elements. A fluid-filled lens with the membrane forward of the substrate (relative to a user's eye) represents a different sequence from a fluid-filled lens with the lens at the front and the membrane rearwards, even if both have the same base curve and range of optical powers.

As detailed above, the VAC may refer to user discomfort in an augmented or virtual reality device caused by the focal plane of virtual content not matching the apparent distance of the virtual content determined by stereoscopy. The vergence angle may be the angle defined by lines of sight, for example, when a pair of eyes look at an object. Typically, the more distant an object is from a viewer, the smaller the vergence angle. Accommodation refers to focusing by an eye. Fluid lenses, for example, fluid lenses including one or more flexures, may be used to correct for VAC in augmented reality or virtual reality devices.

A fluid lens may be configured to have one or both of the following features: in some examples, the strain energy in the membrane is approximately equal for all actuation states; and in some examples, the force reaction at membrane periphery is normal to the guide trajectory. Hence, in some examples, the strain energy of the membrane may be approximately independent of the optical power of the lens. In some examples, the force reaction at the membrane periphery is normal to the guide trajectory, for some or all locations on the guide trajectory.

In some examples, a guide trajectory may be provided by a support structure, such as a flexure. For example, a control point may follow a predetermined trajectory as, for example, a rigid portion of the flexure is displaced by an actuator. A support structure, such as a flexure, may be located entirely outside the fluid volume, entirely inside the fluid volume, or, in some examples, partially within the fluid volume.

In some examples, a fluid lens (which may also be termed a fluid-filled lens) may include a relatively rigid substrate and a flexible polymer membrane. The membrane may be attached to a support structure at or proximate control points around the membrane periphery. A membrane attachment may be used connect the membrane to the support structure, and the movement of the membrane attachment may be controlled by a guide trajectory defined by the configuration of the support structure. The membrane attachment may be provided by a portion of the support structure. A membrane attachment may be attached to the membrane, or a peripheral structure disposed around the membrane. A flexible edge seal may be used to enclose the fluid. The lens power can be adjusted by moving the location of control points along guide trajectories, for example, using one more actuators acting on one or more flexures. Guide trajectories (which may correspond to allowed trajectories of control points, or of membrane attachments attached to the membrane) may be determined that maintain a constant elastic deformation energy of the membrane as the support point location is moved along the guide trajectory. In some examples, guide devices may be attached to (or formed as part of) the substrate, for example, as part of a support structure.

Sources of elastic energy include hoop stress (tension in azimuth) and line strain, and elastic energy may be exchanged between these as the membrane is adjusted. In some examples, the force direction used to adjust the control point location may be normal to the elastic force on the support structure from the membrane. There are many possible advantages to this approach, including much reduced actuator size and power requirements, and a faster lens response that may be restricted only by viscous and friction effects.

In some examples, one or more optical parameters of a fluid lens may be determined at least in part by a physical profile of a membrane, such as the curved profile of the membrane. In some examples, a fluid lens may be configured so that one or more optical parameters of the lens may be adjusted without changing the elastic strain energy in the membrane. In some examples, one or more optical parameters of the lens may be adjusted using an adjustment force, for example, a force applied by an actuator, that is normal to a direction of an elastic strain force in the membrane. In some examples, a guide trajectory may be configured so that the adjustment force is always at least approximately normal to the elastic strain force during adjustment of the fluid lens. For example, the angle between the adjustment force and the elastic strain force may be within 5 degrees of normal, for example, within 3 degrees of normal.

In some examples, a lens fluid may be (or include) a transparent fluid. In this context, a transparent fluid may have little or substantially no visually perceptible visible wavelength absorption over an operational wavelength range. However, fluid lenses may also be used in the UV and the IR, and in some examples the fluid used may be generally non-absorbing in the wavelength range of the desired application, and may not be transparent over some or all of the visible wavelength range.

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or other flowable or otherwise deformable phase.

In some examples, a lens fluid may include an oil, such as an optical oil. In some examples, a lens fluid may include one or more of a silicone, a thiol, or a cyano compound. The fluid may include a silicone based fluid, which may sometimes be referred to as a silicone oil. Example lens fluids include aromatic silicones, such as phenylated siloxanes, for example, pentaphenyl trimethyl trisiloxane.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles. In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands. Reduced bubble formation may greatly enhance the effectiveness of laser protection devices by reducing scattering of the laser radiation and reduction of low-absorption portions of the device.

A fluid lens may include a deformable element such as a polymer membrane, or other deformable element. A polymer membrane may be an elastomer polymer membrane. Membrane thicknesses may be in the range 10 microns-1 mm, for example, between 100 microns and 500 microns.

In some applications, a fluid lens may show gravity sag, which is a typically undesired variation of optical power with height due to a hydrostatic pressure gradient in the fluid lens. Gravity sag may be expressed as change in optical power with height, for example, 0.25 D in 20 mm. In some examples, a coating may be used to modify the elastic properties of a membrane in such a way that gravity sag is reduced or substantially eliminated. In some examples, the elastic properties of flexure components may be adjusted according to the location of a flexure relative to the fluid lens, to compensate for gravity sag.

In some examples, a membrane may be subject to a surface treatment, which may be provided before or after fluid lens assembly. In some examples, a polymer may be applied to the membrane, such as a polymer coating, for example, a fluoropolymer coating. A fluoropolymer coating may include one or more fluoropolymers, such as polytetrafluoroethylene, or its analogs, blends, or derivatives.

In some examples, a fluid lens may include a substrate. In some examples, the substrate may be relatively rigid, and may exhibit no visually perceptible deformation due to, for example, adjusting the internal pressure of the fluid and/or tension in the membrane. In some examples, the substrate may include a generally transparent planar sheet. The substrate may include one more substrate layers, and a substrate layer may include a polymer, glass, optical film, and the like. Example glasses include silicate glasses, such as borosilicate glasses. In some examples, one or both surfaces of a substrate may be planar, spherical, cylindrical, spherocylindrical, convex, concave, parabolic, or have a freeform surface curvature. One or both surfaces of a substrate may approximate a vision correction prescription of a user, and adjustment of the membrane profile may be used to provide an improved prescription, for example, for reading, distance viewing, or other use. In some examples, the substrate may include a rigid ring-like structure, surrounding an aperture, and may support one or more other components within the aperture (such as a window, or curved element), which may also help enclose the lens fluid. In some examples, a ring-like substrate may not be optically transparent, for example, if light may pass through an aperture (e.g., a central aperture) within the substrate. In some examples, a substrate may include a generally rigid material, and may be optically transparent. In some examples, the exterior surface of the substrate, or other surface of a device, may support an antireflection film, anti-scratch coating, or other coating.

Membrane deformation (e.g., a change in the curvature of a membrane profile) may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (which may have a smaller range of adjustments than provided by the membrane). In some examples the substrate may be omitted and the fluid enclosed by a pair of membranes or other configuration of flexible enclosures, such as a pair of membranes. In some examples, a device may include a second membrane or substrate adapted to reduce fluid or other contaminant infusion.

In some examples, a fluid lens may include one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include one or more of an actuator, a flexure, a wire, or other connection hardware. In some examples, one or more actuators are used to adjust the curvature of the membrane, and hence the optical properties of the fluid lens.

Applications of the devices or methods described herein include fluid lenses, and devices which may include one or more fluid lenses, such as eyewear devices (e.g., glasses, augmented reality devices, virtual reality devices, and the like), binoculars, telescopes, cameras, endoscopes, or any imaging device. Applications also include optics, and other applications of fluid lenses. In addition, applications include any lens applications, such as ophthalmic lenses, optics, and other fluid lens applications. Fluid lenses may be incorporated into a variety of different devices, such as eyewear devices (e.g., glasses), binoculars, telescopes, cameras, endoscopes, and/or imaging devices. The principles described herein may be applied in connection with any form of fluid lens. Fluid lenses may also be incorporated into eyewear, such as wearable optical devices like eyeglasses, an augmented reality or virtual reality headset, and/or other wearable optical device. Due to these principles described herein, these devices may exhibit reduced thickness, reduced weight, improved wide-angle/field-of-view optics (e.g., for a given weight), and/or improved aesthetics.

In some examples, similar approaches may be used to lens mass and/or complexity in other optical devices. Applications of the instant disclosure include fluid-filled lens (which may be termed fluid lenses), for example, where the fluid is a liquid, suspension, gas, or other fluid.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to adjust the optical properties of a fluid lens substantially as described herein.

In some examples, a non-transitory computer-readable medium according to the present disclosure may include one or more computer-executable instructions that, when executed by at least one processor of a computing device, cause the computing device to adjust the optical properties of a fluid lens substantially as described herein.

In some examples, a fluid lens (e.g., a fluid lens) includes a substrate, a flexible membrane, and a fluid located with a cavity formed between the substrate and the membrane. Bubble formation within the lens fluid may reduce optical quality and aesthetics of the lens. In some applications, reduced pressure may be applied (e.g., to obtain a concave lens surface, for negative optical power) and this may induce bubble formation on the inside surfaces of the substrate and membrane.

In some examples, inside surfaces (e.g., surfaces adjacent the lens fluid) may be treated to reduce or substantially eliminate bubble formation within the fluid of a fluid lens. The number of nucleation sites for bubble formation may be reduced using a surface coating and/or other treatment. The surface coating may be formed on the interior surface of the cavity before filling the cavity with the fluid, and in some examples may occur after filing using components added to the fluid. For example, the surfaces may be coated with a polymer layer (e.g., by polymerizing a surface monomer layer), or with a fluid, gel, or emulsion layer that is immiscible with the lens liquid. A coating may include one or more of various materials, such as an acrylate polymer, a silicone polymer, an epoxy-based polymer, or a fluoropolymer. In some examples, a coating may include a fluoroacrylate polymer, such as perfluoroheptylacrylate, or other fluoroalkylated acrylate polymer.

FIG. 34 shows an example near-eye display system such as an augmented reality system. The system 3400 may include a near-eye display (NED) 3410 and a control system 3420, which may be communicatively coupled to each other. The near-eye display 3410 may include lenses 3421, electroactive devices 3414, displays 3416, and a sensor 3418. Control system 3420 may include a control element 3422, a force lookup table 3424, and augmented reality logic 3426.

Augmented reality logic 3426 may determine what virtual objects are to be displayed and real-world positions onto which the virtual objects are to be projected. Accordingly, augmented reality logic 3426 may generate an image stream 3428 that is displayed by displays 3416 in such a way that alignment of right- and left-side images displayed in displays 3416 results in ocular vergence toward a desired real-world position.

The control system 3422 may be configured to control one or more adjustable lenses, for example, a fluid element located within a near-eye display. Lens adjustment may be based on the desired perceived distance to a virtual object (this may, for example, include augmented reality image elements).

Control element 3422 may use the same positioning information determined by augmented reality logic 3426, in combination with force lookup table (LUT) 3424, to determine an amount of force to be applied by electroactive devices 3414 (e.g., actuators), as described herein, to lenses 3412. Electroactive devices 3414 may, responsive to control element 3422, apply appropriate forces to lenses 3412 to adjust the apparent accommodation distance of virtual images displayed in displays 3416 to match the apparent vergence distance of the virtual images, thereby reducing or eliminating vergence-accommodation conflict. Control element 3422 may be in communication with sensor 3418, which may measure a state of the adjustable lens. Based on data received from sensor 3418, the control element 3422 may adjust electroactive devices 3414 (e.g., as a closed-loop control system).

In some embodiments, display system 3400 may display multiple virtual objects at once and may determine which virtual object a user is viewing (or is likely to be viewing) to identify a virtual object for which to correct the apparent accommodation distance. For example, the system may include an eye-tracking system (not shown) that provides information to control element 3422 to enable control element 3422 to select the position of the relevant virtual object.

Additionally or alternatively, augmented reality logic 3426 may provide information about which virtual object is the most important and/or most likely to draw the attention of the user (e.g., based on spatial or temporal proximity, movement, and/or a semantic importance metric attached to the virtual object). In some embodiments, the augmented reality logic 3426 may identify multiple potentially important virtual objects and select an apparent accommodation distance that approximates the virtual distance of a group of the potentially important virtual objects.

Control system 3420 may represent any suitable hardware, software, or combination thereof for managing adjustments to adjustable lenses 3412. In some embodiments, control system 3420 may represent a system on a chip (SOC). As such, one or more portions of control system 3420 may include one or more hardware modules. Additionally or alternatively, one or more portions of control system 3420 may include one or more software modules that perform one or more of the tasks described herein when stored in the memory of a computing device and executed by a hardware processor of the computing device.

Control system 3420 may generally represent any suitable system for providing display data, augmented reality data, and/or augmented reality logic for a head-mounted display. In some embodiments, a control system 3420 may include a graphics processing unit (GPU) and/or any other type of hardware accelerator designed to optimize graphics processing.

Control system 3420 may be implemented in various types of systems, such as augmented reality glasses, which may further include one or more adjustable focus lenses coupled to a frame (e.g., using an eyewire). In some embodiments, a control system may be integrated into a frame of an eyewear device. Alternatively, all or a portion of control system may be in a system remote from the eyewear, and, for example, configured to control electroactive devices (e.g., actuators) in the eyewear via wired or wireless communication.

The control system may control the operations of the light source and, in some cases, the optics system. In some embodiments, the controller may be the graphics processing unit (GPU) of a display device. In some embodiments, the controller may include one or more different or additional processors. The operations performed by the controller may include taking content for display and dividing the content into discrete sections. The controller may instruct the light source to sequentially present the discrete sections using light emitters corresponding to a respective row in an image ultimately displayed to the user. The controller may instruct the optics system to adjust the light. For example, the controller may control the optics system to scan the presented discrete sections to different areas of a coupling element of the output waveguide. Accordingly, at the exit pupil of the output waveguide, each discrete portion may be presented in a different location. While each discrete section is presented at different times, the presentation and scanning of the discrete sections may occur fast enough such that a user's eye integrates the different sections into a single image or series of images. The controller may also provide scanning instructions to the light source that include an address corresponding to an individual source element of the light source and/or an electrical bias applied to the individual source element. The control system may also be configured to control one or more actuators associated with a fluid lens, for example, through the provision of electrical signals to the one or more actuators.

A controller may include an image processing unit. The controller, or component image processing unit, may include a general-purpose processor and/or one or more application-specific circuits that are dedicated to performing the features described herein. In one embodiment, a general-purpose processor may be coupled to a memory device to execute software instructions that cause the processor to perform certain processes described herein. In some embodiments, the image processing unit may include one or more circuits that are dedicated to performing certain features. The image processing unit may be a stand-alone unit that is separate from the controller and the driver circuit, but in some embodiments the image processing unit may be a sub-unit of the controller or the driver circuit. In other words, in those embodiments, the controller or the driver circuit performs various image processing procedures of the image processing unit. The image processing unit may also be referred to as an image processing circuit. A controller may be configured to provide an electrical signal to one or more actuators within a fluid lens, for example, to adjust the optical power of the fluid lens.

Ophthalmic applications of the devices described herein include spectacles with a flat front (or other curved) substrate and an adjustable eye-side concave or convex membrane surface. Applications include optics, and other applications of fluid lenses, including augmented reality or virtual reality headsets.

In some examples, a device includes a fluid lens, and the fluid lens includes a substrate, a membrane, a fluid located within a cavity, where the cavity is at least partially defined by the substrate and the membrane, and a flexure interconnecting the membrane and the substrate. The flexure may include a membrane attachment and an elastic element, where the membrane attachment is connected to the membrane (e.g., at a control point of the membrane). An example device may be configured so that a displacement of the membrane attachment adjusts an optical power of the fluid lens, for example, by modifying the profile of the membrane. The membrane may have a curved profile, such as a spherical profile, and adjustment of the location and/or orientation of the membrane attachment may modify, for example, a radius of curvature of a spherical profile of the membrane. An example device may further include an actuator, such as a piezoelectric actuator, configured to induce the displacement of the membrane attachment. In some examples, the displacement of the membrane attachment may induce a deformation of the elastic element. The deformation of the elastic element may exert a force (e.g., an elastic force) on the membrane attachment that at least partially counteracts a second elastic force exerted on the membrane attachment by the membrane. This counteracting force (to the membrane force) exerted due to the deformation of the elastic element may appreciably reduce or substantially eliminate the energy required to displace the membrane attachment. In some examples, the control points of the membrane may be approximately co-planar and may define what may be termed the plane of the membrane. In some examples, the force induced in the flexure by displacement of the membrane attachment may be an approximately normal force to the plane of the membrane, and may at least partially counteract the force exerted by the membrane. In some examples, a device includes a membrane in tension, and displacing the control points of the membrane (e.g., by displacing the membrane attachments using an actuator) may create a force in the flexure that at least partially counteracts the force exerted by the membrane on the flexure.

In some examples, a device includes a fluid lens, where the fluid lens includes a substrate, a membrane, a fluid located within a cavity, where the cavity is at least partially defined by the substrate and the membrane, and a flexure interconnecting the membrane and the substrate. The flexure may include a membrane attachment and an elastic element, where the membrane attachment is connected to the membrane, the device is configured so that a displacement of the membrane attachment adjusts a profile of the membrane, and the displacement of the membrane attachment induces a deformation of the elastic element. The displacement of the membrane attachment may induce a compression of at least a portion of the elastic element, and may, for example, induce both a compressive stress and a tensile strain within the elastic element. The optical power of the fluid lens may be adjustable by adjusting the profile of the membrane. The elastic element may include a rubber material, such as a synthetic rubber. The flexure may include a pair of elastic elements, which may be generally parallel to each other. A rigid element may be attached to each of the pair of elastic elements, and, for example, a single rigid element may be attached to both elastic elements of the pair elastic elements. The device may be an eyewear device.

In some examples, a method includes: providing a fluid lens including a membrane connected to a substrate using a flexure, the flexure including an elastic element and a rigid element; applying a force to the rigid element; and deforming the elastic element to adjust the fluid lens, where deforming the elastic element includes compressing at least a portion of the elastic element. Applying a force to the rigid element may include displacing the rigid element using an actuator. Deforming the elastic element to adjust the fluid lens may include modifying a profile of the membrane. The method may be a method of adjusting an optical power of a fluid lens.

A fluid-filled lens may include a relatively rigid substrate and a flexible polymer membrane. Lens power may be adjusted by moving the location of membrane control points along guide trajectories. In some examples, a membrane attachment may be connected to, for example, the lens substrate using a support structure that includes at least one flexible element, such as an elastomer flexure. In some examples, the elastomer flexure may include a natural rubber, or a synthetic elastomer such as a nitrile rubber (e.g., an acrylonitrile butadiene rubber), or a silicone rubber. In some examples, a support structure may include a rigid element attached to the membrane at or proximate a control point, and one or more flexible elements that connect the rigid element to, for example, the lens substrate. In some examples, a support structure may include spaced apart flexible elements, such as parallel (or near-parallel) elastomer beams. Support structures may provide (at least approximately) zero-work guide trajectories (e.g., for one or more control points of the membrane), which do not appreciably modify the elastic energy of the membrane as the control point (or, in some examples, a proximate membrane attachment) is moved along the guide trajectory. Zero-work guide trajectories may reduce or substantially eliminate the energy required for lens power adjustment. In some examples, elastomer-based support structures may avoid problems (e.g., hysteresis and/or stiction) that may occur using other configurations, such as sliders. This may allow improved smoother actuation of a fluid lens (such as a liquid lens). Examples may also include flexures generally, which may be used in other applications.

EXAMPLE EMBODIMENTS

Example 1. A device including a fluid lens, where the fluid lens includes: a substrate; a membrane; a fluid located within a cavity, where the cavity is at least partially defined by the substrate and the membrane; and flexure interconnecting the membrane and the substrate, where the flexure includes a membrane attachment and an elastic element, the membrane attachment is connected to the membrane, the device is configured so that a displacement of the membrane attachment adjusts an optical power of the fluid lens, and the displacement of the membrane attachment induces a deformation of the elastic element.

Example 2. The device of example 1, further including an actuator configured to induce the displacement of the membrane attachment.

Example 3. The device of any of examples 1-2, where the deformation of the elastic element exerts a force on the membrane attachment that at least partially counteracts a membrane force exerted on the membrane attachment by the membrane.

Example 4. The device of any of examples 2-3, where the force exerted on the membrane attachment by the deformation of the elastic element reduces the energy required by the actuator to displace the membrane attachment.

Example 5. The device of any of examples 1-4, where the displacement of the membrane attachment induces a compression of at least a portion of the elastic element.

Example 6. The device of any of examples 1-5, where the displacement of the membrane attachment induces a compressive stress within a first portion of the elastic element, and a tensile strain within a second portion of the elastic element.

Example 7. The device of any of examples 1-6, where the elastic element includes a rubber material.

Example 8. The device of any of examples 1-7, where the rubber material includes a synthetic rubber.

Example 9. The device of any of examples 1-8, where the device further includes a flexure support attached to the elastic element, where the flexure support rigidly attaches the flexure to the substrate.

Example 10. The device of any of examples 1-9, where the flexure includes a pair of elastic elements, the pair of elastic elements including the elastic element, where the pair of elastic elements are generally parallel to each other.

Example 11. The device of any of examples 1-10, further including a rigid element attached to the pair of elastic elements.

Example 12. The device of example 11, where the rigid element includes the membrane attachment.

Example 13. The device of any of examples 11-12, where the membrane attachment is connected to the rigid element.

Example 14. The device of any of examples 11-13, where the membrane attachment is connected to the rigid element by an elastic connector.

Example 15. The device of any of examples 1-14, where the elastic element is rigidly attached to the substrate and provides a flexible connection between the substrate and a rigid element, the rigid element being attached to the membrane by the membrane attachment.

Example 16. The device of any of examples 1-15, further including a frame configured to support the fluid lens, where the device is an eyewear device.

Example 17. A method including: providing a fluid lens including a membrane connected to a substrate using a flexure, the flexure including an elastic element and a rigid element; applying a force to the rigid element; and deforming the elastic element to adjust the fluid lens, where deforming the elastic element includes compressing at least a portion of the elastic element.

Example 18. The method of example 17, where applying a force to the rigid element includes displacing the rigid element using an actuator.

Example 19. The method of any of examples 17-18, where displacing the rigid element induces a first elastic force exerted on the rigid element by the elastic element, that at least partially counteracts a second elastic force exerted on the rigid element by the membrane.

Example 20. The method of any of examples 17-19, where deforming the elastic element to adjust the fluid lens includes modifying a profile of the membrane, where the method includes a method of adjusting an optical power of a fluid lens.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (e.g., augmented-reality system 3500 in FIG. 35) or that visually immerses a user in an artificial reality (e.g., virtual-reality system 3600 in FIG. 36). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 35, augmented-reality system 3500 may include an eyewear device 3502 with a frame 3510 configured to hold a left display device 3515(A) and a right display device 3515(B) in front of a user's eyes. Display devices 3515(A) and 3515(B) may act together or independently to present an image or series of images to a user. While augmented-reality system 3500 includes two displays, embodiments of this disclosure may be implemented in augmented-reality systems with a single NED or more than two NEDs.

In some embodiments, augmented-reality system 3500 may include one or more sensors, such as sensor 3540. Sensor 3540 may generate measurement signals in response to motion of augmented-reality system 3500 and may be located on substantially any portion of frame 3510. Sensor 3540 may represent a position sensor, an inertial measurement unit (IMU), a depth camera assembly, a structured light emitter and/or detector, or any combination thereof. In some embodiments, augmented-reality system 3500 may or may not include sensor 3540 or may include more than one sensor. In embodiments in which sensor 3540 includes an IMU, the IMU may generate calibration data based on measurement signals from sensor 3540. Examples of sensor 3540 may include, without limitation, accelerometers, gyroscopes, magnetometers, other suitable types of sensors that detect motion, sensors used for error correction of the IMU, or some combination thereof.

Augmented-reality system 3500 may also include a microphone array with a plurality of acoustic transducers 3520(A)-3520(J), referred to collectively as acoustic transducers 3520. Acoustic transducers 3520 may be transducers that detect air pressure variations induced by sound waves. Each acoustic transducer 3520 may be configured to detect sound and convert the detected sound into an electronic format (e.g., an analog or digital format). The microphone array in FIG. 2 may include, for example, ten acoustic transducers: 3520(A) and 3520(B), which may be designed to be placed inside a corresponding ear of the user, acoustic transducers 3520(C), 3520(D), 3520(E), 3520(F), 3520(G), and 3520(H), which may be positioned at various locations on frame 3510, and/or acoustic transducers 3520(I) and 3520(J), which may be positioned on a corresponding neckband 3505.

In some embodiments, one or more of acoustic transducers 3520(A)-(F) may be used as output transducers (e.g., speakers). For example, acoustic transducers 3520(A) and/or 3520(B) may be earbuds or any other suitable type of headphone or speaker.

The configuration of acoustic transducers 3520 of the microphone array may vary. While augmented-reality system 3500 is shown in FIG. 35 as having ten acoustic transducers 3520, the number of acoustic transducers 3520 may be greater or less than ten. In some embodiments, using higher numbers of acoustic transducers 3520 may increase the amount of audio information collected and/or the sensitivity and accuracy of the audio information. In contrast, using a lower number of acoustic transducers 3520 may decrease the computing power required by an associated controller 3550 to process the collected audio information. In addition, the position of each acoustic transducer 3520 of the microphone array may vary. For example, the position of an acoustic transducer 3520 may include a defined position on the user, a defined coordinate on frame 3510, an orientation associated with each acoustic transducer 3520, or some combination thereof.

Acoustic transducers 3520(A) and 3520(B) may be positioned on different parts of the user's ear, such as behind the pinna, behind the tragus, and/or within the auricle or fossa. Or, there may be additional acoustic transducers 3520 on or surrounding the ear in addition to acoustic transducers 3520 inside the ear canal. Having an acoustic transducer 3520 positioned next to an ear canal of a user may enable the microphone array to collect information on how sounds arrive at the ear canal. By positioning at least two of acoustic transducers 3520 on either side of a user's head (e.g., as binaural microphones), augmented-reality device 3500 may simulate binaural hearing and capture a 3D stereo sound field around about a user's head. In some embodiments, acoustic transducers 3520(A) and 3520(B) may be connected to augmented-reality system 3500 via a wired connection 3530, and in other embodiments acoustic transducers 3520(A) and 3520(B) may be connected to augmented-reality system 3500 via a wireless connection (e.g., a Bluetooth connection). In still other embodiments, acoustic transducers 3520(A) and 3520(B) may not be used at all in conjunction with augmented-reality system 3500.

Acoustic transducers 3520 on frame 3510 may be positioned along the length of the temples, across the bridge, above or below display devices 3515(A) and 3515(B), or some combination thereof. Acoustic transducers 3520 may be oriented such that the microphone array is able to detect sounds in a wide range of directions surrounding the user wearing the augmented-reality system 3500. In some embodiments, an optimization process may be performed during manufacturing of augmented-reality system 3500 to determine relative positioning of each acoustic transducer 3520 in the microphone array.

In some examples, augmented-reality system 3500 may include or be connected to an external device (e.g., a paired device), such as neckband 3505. Neckband 3505 generally represents any type or form of paired device. Thus, the following discussion of neckband 3505 may also apply to various other paired devices, such as charging cases, smart watches, smart phones, wrist bands, other wearable devices, hand-held controllers, tablet computers, laptop computers, other external compute devices, etc.

As shown, neckband 3505 may be coupled to eyewear device 3502 via one or more connectors. The connectors may be wired or wireless and may include electrical and/or non-electrical (e.g., structural) components. In some cases, eyewear device 3502 and neckband 3505 may operate independently without any wired or wireless connection between them. While FIG. 35 illustrates the components of eyewear device 3502 and neckband 3505 in example locations on eyewear device 3502 and neckband 3505, the components may be located elsewhere and/or distributed differently on eyewear device 3502 and/or neckband 3505. In some embodiments, the components of eyewear device 3502 and neckband 3505 may be located on one or more additional peripheral devices paired with eyewear device 3502, neckband 3505, or some combination thereof.

Pairing external devices, such as neckband 3505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3500 may be provided by a paired device or shared between a paired device and an eyewear device, thus reducing the weight, heat profile, and form factor of the eyewear device overall while still retaining desired functionality. For example, neckband 3505 may allow components that would otherwise be included on an eyewear device to be included in neckband 3505 since users may tolerate a heavier weight load on their shoulders than they would tolerate on their heads. Neckband 3505 may also have a larger surface area over which to diffuse and disperse heat to the ambient environment. Thus, neckband 3505 may allow for greater battery and computation capacity than might otherwise have been possible on a stand-alone eyewear device. Since weight carried in neckband 3505 may be less invasive to a user than weight carried in eyewear device 3502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 3505 may be communicatively coupled with eyewear device 3502 and/or to other devices. These other devices may provide certain functions (e.g., tracking, localizing, depth mapping, processing, storage, etc.) to augmented-reality system 3500. In the embodiment of FIG. 35, neckband 3505 may include two acoustic transducers (e.g., 3520(I) and 3520(J)) that are part of the microphone array (or potentially form their own microphone subarray). Neckband 3505 may also include a controller 3525 and a power source 3535.

Acoustic transducers 3520(I) and 3520(J) of neckband 3505 may be configured to detect sound and convert the detected sound into an electronic format (analog or digital). In the embodiment of FIG. 35, acoustic transducers 3520(I) and 3520(J) may be positioned on neckband 3505, thereby increasing the distance between the neckband acoustic transducers 3520(I) and 3520(J) and other acoustic transducers 3520 positioned on eyewear device 3502. In some cases, increasing the distance between acoustic transducers 3520 of the microphone array may improve the accuracy of beamforming performed via the microphone array. For example, if a sound is detected by acoustic transducers 3520(C) and 3520(D) and the distance between acoustic transducers 3520(C) and 3520(D) is greater than, for example, the distance between acoustic transducers 3520(D) and 3520(E), the determined source location of the detected sound may be more accurate than if the sound had been detected by acoustic transducers 3520(D) and 3520(E).

Controller 3525 of neckband 3505 may process information generated by the sensors on neckband 3505 and/or augmented-reality system 3500. For example, controller 3525 may process information from the microphone array that describes sounds detected by the microphone array. For each detected sound, controller 3525 may perform a direction-of-arrival (DOA) estimation to estimate a direction from which the detected sound arrived at the microphone array. As the microphone array detects sounds, controller 3525 may populate an audio data set with the information. In embodiments in which augmented-reality system 3500 includes an inertial measurement unit, controller 3525 may compute all inertial and spatial calculations from the IMU located on eyewear device 3502. A connector may convey information between augmented-reality system 3500 and neckband 3505 and between augmented-reality system 3500 and controller 3525. The information may be in the form of optical data, electrical data, wireless data, or any other transmittable data form. Moving the processing of information generated by augmented-reality system 3500 to neckband 3505 may reduce weight and heat in eyewear device 3502, making it more comfortable to the user.

Power source 3535 in neckband 3505 may provide power to eyewear device 3502 and/or to neckband 3505. Power source 3535 may include, without limitation, lithium ion batteries, lithium-polymer batteries, primary lithium batteries, alkaline batteries, or any other form of power storage. In some cases, power source 3535 may be a wired power source. Including power source 3535 on neckband 3505 instead of on eyewear device 3502 may help better distribute the weight and heat generated by power source 3535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 3600 in FIG. 36, that mostly or completely covers a user's field of view. Virtual-reality system 3600 may include a front rigid body 3602 and a band 3604 shaped to fit around a user's head. Virtual-reality system 3600 may also include output audio transducers 3606(A) and 3606(B). Furthermore, while not shown in FIG. 36, front rigid body 3602 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented-reality system 3500 and/or virtual-reality system 3600 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, fluid lenses such as adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial reality systems may include one or more projection systems. For example, display devices in augmented-reality system 3500 and/or virtual-reality system 3600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system augmented-reality system 3500 and/or virtual-reality system 3600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, head-mounted devices may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

Artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

Features from any of the embodiments described herein may be used in combination with one another in accordance with the general principles described herein. These and other embodiments, features, and advantages will be more fully understood upon reading the following detailed description in conjunction with the accompanying drawings and claims.

What is claimed is:

1. A device comprising a fluid lens, wherein the fluid lens comprises:
   a substrate;
   a membrane assembly comprising a membrane and a peripheral structure surrounding the membrane;
   an edge seal;
   a flexure support attached to the substrate;
   a fluid located within a fluid volume, wherein the fluid volume is at least partially defined by the edge seal, the substrate and the membrane; and
   a flexure interconnecting the membrane assembly and the flexure support, wherein:
      the edge seal extends around a periphery of the fluid volume;
      the flexure is located outside of the fluid volume;
      the flexure comprises a membrane attachment and an elastic element;
      the membrane attachment is connected to the membrane assembly;
      the flexure comprises a pair of elastic elements, the pair of elastic elements comprising the elastic element;
      the pair of elastic elements is connected to a rigid element, and the membrane attachment is connected to the rigid element by an elastic connector;
      the pair of elastic elements are generally parallel to each other and extend between the rigid element and the flexure support;
      the device is configured so that a displacement of the membrane attachment adjusts an optical power of the fluid lens; and
      the displacement of the membrane attachment induces a deformation of the elastic element.

2. The device of claim 1, further comprising an actuator configured to induce the displacement of the membrane attachment.

3. The device of claim 2, wherein the deformation of the elastic element exerts a force on the membrane attachment that at least partially counteracts a membrane force exerted on the membrane attachment by the membrane.

4. The device of claim 3, wherein the force exerted on the membrane attachment by the deformation of the elastic element reduces an energy required by the actuator to displace the membrane attachment.

5. The device of claim 1, wherein the displacement of the membrane attachment induces a compression of at least a portion of the elastic element.

6. The device of claim 1, wherein the displacement of the membrane attachment induces a compressive stress within a first portion of the elastic element, and a tensile strain within a second portion of the elastic element.

7. The device of claim 1, wherein the elastic element comprises a rubber material.

8. The device of claim 7, wherein the rubber material comprises a synthetic rubber.

9. The device of claim 1, wherein the flexure support rigidly attaches the flexure to the substrate.

10. The device of claim 1, wherein:
    the pair of elastic elements extend from the flexure support as elongated flexure arms; and
    the pair of elastic elements include a both compressive strain and tensile strain on the displacement of the membrane attachment.

11. The device of claim 1, wherein the pair of elastic elements is rigidly attached to the substrate by the flexure support and provides a flexible connection between the substrate and the rigid element.

12. The device of claim 1, further comprising a frame configured to support the fluid lens, wherein the device is an eyewear device.

13. The device of claim 12, wherein the device is an augmented reality device.

14. The device of claim 1, wherein the elastic element comprises a polymer elastomer.

15. A method comprising,
    providing a fluid lens comprising a membrane assembly connected to a substrate using a flexure, the flexure comprising an elastic element and a membrane attachment that is attached to the membrane assembly, the membrane assembly comprising a peripheral structure surrounding a membrane;
    applying a force to the membrane attachment; and
    deforming the elastic element to adjust the fluid lens, wherein deforming the elastic element comprises compressing at least a portion of the elastic element,
    wherein:
       the fluid lens further comprises an edge seal, a flexure support attached to the substrate, and a fluid located within a fluid volume at least partially defined by the edge seal, the substrate and the membrane;
       the flexure interconnects the membrane and the flexure support;
       the edge seal extends around a periphery of the fluid volume;
       the flexure is located outside of the fluid volume;
       the flexure comprises a pair of elastic elements, the pair of elastic elements comprising the elastic element, wherein the pair of elastic elements are generally parallel to each other and extend between the membrane attachment and the flexure support;

the pair of elastic elements is connected to a rigid element, and the membrane attachment is connected to the rigid element by an elastic connector;

the fluid lens is configured so that a displacement of the membrane attachment adjusts an optical power of the fluid lens; and the displacement of the membrane attachment induces a deformation of the elastic element.

16. The method of claim 15, wherein applying the force to the rigid element comprises displacing the rigid element using an actuator.

17. The method of claim 15, wherein displacing the rigid element induces a first elastic force exerted on the rigid element by the elastic element, that at least partially counteracts a second elastic force exerted on the rigid element by the membrane.

18. The method of claim 15, wherein deforming the elastic element to adjust the fluid lens comprises modifying a profile of the membrane.

* * * * *